(12) United States Patent
Armstrong et al.

(10) Patent No.: US 12,131,277 B2
(45) Date of Patent: Oct. 29, 2024

(54) SYSTEM AND METHOD OF PREDICTING A REPAIR PROJECT

(71) Applicant: Smart Media LLC, Denison, TX (US)

(72) Inventors: Garen W. Armstrong, Overland Park, KS (US); Paul M. Payne, Denver, CO (US); Shae M. Adams, Lake Worth, FL (US)

(73) Assignee: Smart Media LLC, Denison, TX (US)

( * ) Notice: Subject to any disclaimer, the term of this patent is extended or adjusted under 35 U.S.C. 154(b) by 0 days.

(21) Appl. No.: 18/195,584

(22) Filed: May 10, 2023

(65) Prior Publication Data

US 2023/0368095 A1    Nov. 16, 2023

Related U.S. Application Data

(60) Provisional application No. 63/340,136, filed on May 10, 2022.

(51) Int. Cl.
*G06Q 10/0631* (2023.01)
*G06Q 10/0875* (2023.01)
*G06Q 10/10* (2023.01)
*G06Q 30/0202* (2023.01)
*G06Q 30/0204* (2023.01)
*G06Q 40/08* (2012.01)

(52) U.S. Cl.
CPC .......... *G06Q 10/06313* (2013.01); *G06Q 10/063118* (2013.01); *G06Q 10/0875* (2013.01); *G06Q 10/103* (2013.01); *G06Q 30/0202* (2013.01); *G06Q 30/0205* (2013.01); *G06Q 40/08* (2013.01)

(58) Field of Classification Search
CPC .................. G06Q 40/08; G06Q 10/06313
See application file for complete search history.

(56) References Cited

U.S. PATENT DOCUMENTS

2016/0048934 A1 *   2/2016   Gross ............... G06V 10/40
                                              705/313

* cited by examiner

*Primary Examiner* — Edward Chang
(74) *Attorney, Agent, or Firm* — Erise IP, P.A.

(57) ABSTRACT

Systems, methods, and computer-readable media for predicting a repair project are disclosed. The repair project may be a roof repair. Various data inputs may be received and analyzed to determine the likelihood of obtaining a repair job. The repair job may be associated with a lead score. The lead score may indicate a likelihood of obtaining the repair job. Repair jobs with lead scores over a threshold may be pursued to obtain the repair job. Materials may be automatically ordered to preempt obtaining the repair job. Workers for carrying out the repair job may be automatically determined and scheduled.

20 Claims, 9 Drawing Sheets

SYSTEM AND METHOD OF PREDICTING A REPAIR PROJECT

CROSS REFERENCE TO RELATED APPLICATIONS

This non-provisional patent application claims prior benefit, with regard to all subject matter, of U.S. Provisional Patent Application No. 63/340,136, filed May 10, 2022, and titled "SYSTEM AND METHOD OF PREDICTING A REPAIR PROJECT". The identified earlier-filed provisional patent application is hereby incorporated by reference in its entirety.

BACKGROUND

1. Field

Embodiments of the present disclosure relate to predicting roofing repair projects, estimated materials required for the predicted repair projects, and scheduling work crews for the predicted repair projects. Specifically, embodiments of the present disclosure relate to generating recommendations of the amount and types of material to purchase in preparation of future repair products, determining trends and metrics of repair projects, and other generated determinations, estimations, or recommendations.

2. Related Art

Roofing repair businesses, and other similarly situational businesses, must walk a delicate balance of purchasing enough material and inventory and employing enough workers to respond to new projects, without having an excess of materials that can limit cash flow and which may be exposed to wear and tear. Typically, businesses will only retain the amount of material necessary to respond to a limited number of repair projects at any one time, which may result in a risk of missing out on additional projects. Further, with new technological innovations, there are now a greater number and variety of roofing materials than ever before, making it difficult to know how much of any one product to retain. Accordingly, in addition to estimating the amount of material to retain, businesses must also choose the right products to purchase.

Estimating the amount of material necessary to respond to an average number of repair projects can be a difficult process if performed manually, requiring extensive review of the price of materials, accurate tracking of current inventory, estimating how much material is required per job, among other factors. In businesses that are cash-flow dependent, incorrect estimations can result in either a surplus of materials that are unused, or deficient amounts of materials leading to lost jobs. Existing resources may provide weekly forecasting predictions, which may provide insight to a business at a large scale but fail to provide granularity and details that are required for day-to-day functionality.

Accordingly, what is needed is a process of estimating how much materials to purchase in preparation of repair projects, that utilizes information from a variety of sources to provide accurate short- and long-term recommendations for purchasing the type and number of materials needed.

SUMMARY

In some aspects, the techniques described herein relate to a system for generating repair project recommendations, the system including: a computing device programmed to: receive information indicative of a potential repair project; obtain data inputs including at least one of materials data, weather forecasting information, insurance information, housing information, business information, business metrics, client information, project information, or project information; perform analysis of the obtained data inputs; generate a recommendation, estimate, or determination based at least in part on the analysis of the obtained data inputs; display the generated recommendation, estimate, or determination on a client device; and without human intervention, perform an action in furtherance of the repair project, wherein the action is based at least in part on the generated recommendation, estimate, or determination.

In some embodiments, the techniques described herein relate to a method for predicting repair projects, including: receiving a plurality of information for a geographic region, wherein the plurality of information includes weather information and homeowner information; dividing the geographic region into a plurality of subregions based on the weather information, wherein each subregion is weighted based on the weather information, the weighting based on a first likelihood of homes within a subregion having structural damage; determining, based on the weighting, at least one subregion of the plurality of subregions for pursuing a lead; generating, based on the plurality of information for the geographic region and for a home in the subregion, a lead score for the home, wherein the lead score is indicative of a second likelihood of obtaining a repair job for the home, wherein the lead score is determined based on a plurality of weighted attributes, and wherein the plurality of weighted attributes includes at least one of homeowner demographic attributes, homeowner financial attributes, or home value attributes; responsive to determining that the lead score is greater than a threshold lead score, determining a project manager for the lead; determining that the repair job associated with the lead is likely to be accepted; responsive to determining that the repair job is likely to be accepted, automatically generating a materials order for the repair job, wherein automatically generating the materials order includes: analyzing materials databases associated with one or more materials suppliers; retrieving dimensional data associated with the home; and determining materials to order and a quantity of the materials to order based on analyzing the materials databases and the dimensional data; automatically determining a number of workers for the repair job; and generating a schedule for the workers to carry out the repair job.

In some embodiments, the techniques described herein relate to a method, wherein the plurality of weighted attributes is determined by: assigning a weight to each of a plurality of attributes; determining, for each of the plurality of attributes, an attribute value score; and determining the weighted attribute based on the weight and the value attributes value score.

In some embodiments, the techniques described herein relate to a method, wherein the weather information includes predictive weather information and the method further includes: determining, based on the predictive weather information, a third likelihood of homes having structural damage; and responsive to determining the third likelihood, automatically generating an additional materials order for surplus materials for repairing at least a subset of the homes.

In some embodiments, the techniques described herein relate to a method, further including: receiving, for the subregion, historical information of previous repair jobs in the subregion, based on the historical information, automatically adjusting a process for obtaining repair jobs in the subregion.

In some embodiments, the techniques described herein relate to a method, wherein the process is a marketing campaign targeted at the subregion, and wherein automatically adjusting the process includes providing a recommendation of at least one media channel to target homeowners in the subregion.

In some embodiments, the techniques described herein relate to a method, further including: determining a buy ratio for at least one insurer associated with the repair job; and adjusting automatically generating the materials order based on the buy ratio.

In some embodiments, the techniques described herein relate to a method, wherein the weather information is indicative of a weather event and the method further includes: determining that the weather event produced an output greater than a threshold output in a subregion; determining a plurality of lead scores for at least a subset of the homes in the subregion; and based on the output being greater than the threshold output and at least a subset of the plurality of lead scores being greater than a threshold lead score, initiating a communications event to homeowners associated with a plurality of homes in the subregion.

In some embodiments, the techniques described herein relate to a method, wherein the communications event is a mass SMS event.

In some embodiments, the techniques described herein relate to one or more non-transitory computer-readable media storing computer-executable instructions that, when executed by at least one processor, perform a method for predicting repair projects, receiving a plurality of information for a geographic region, wherein the plurality of information includes weather information and homeowner information; dividing the geographic region into a plurality of subregions based on the weather information, wherein each subregion is weighted based on the weather information, the weighting based on a first likelihood of homes within a subregion having structural damage; determining, based on the weighting, at least one subregion of the plurality of subregions for pursuing a lead; generating, based on the plurality of information for the geographic region and for a home in the subregion, a lead score for the home, wherein the lead score is indicative of a second likelihood of obtaining a repair job for the home, wherein the lead score is determined based on a plurality of weighted attributes; responsive to determining that the lead score is greater than a threshold lead score, determining a project manager for the lead; determining that the repair job associated with the lead is likely to be accepted; responsive to determining that the repair job is likely to be accepted, automatically requisitioning materials for the repair job, wherein requisitioning the materials includes: retrieving dimensional data of the home; and determining a quantity of materials to requisition based on the dimensional data; automatically determining a number of workers needed for the repair job; and generating a schedule for the workers to carry out the repair job.

In some embodiments, the techniques described herein relate to a media, wherein the plurality of weighted attributes includes at least one of homeowner demographic attributes or homeowner financial attributes.

In some embodiments, the techniques described herein relate to a media, wherein the plurality of information further includes a buy ratio of an insurance company associated with the repair job, and wherein automatically requisitioning the materials is further based on the buy ratio of the insurance company.

In some embodiments, the techniques described herein relate to a media, wherein the method further includes: causing display of a user interface, the user interface configured for collaboration between a homeowner associated with the repair job and an insurance adjuster associated with the repair job, wherein the user interface enables simultaneous collaboration of one or more documents associated with the repair job.

In some embodiments, the techniques described herein relate to a media, wherein the method further includes: responsive to determining that the number of workers is greater than a number of available workers, generating a request to subcontract the repair job.

In some embodiments, the techniques described herein relate to a media, wherein the plurality of weighted attributes includes a roof cover weighted attribute and a building square footage weighted attribute.

In some embodiments, the techniques described herein relate to a media, wherein requisitioning the materials further includes: analyzing predictive weather information; determining that the predictive weather information is indicative of a severe weather event; and responsive to the determining, requisitioning materials in preparation for predicted repair jobs resulting from the severe weather event.

In some embodiments, the techniques described herein relate to a system for predicting repair projects including one or more non-transitory computer-readable media storing computer-executable instructions that, when executed by at least one processor, execute instructions, including: receiving a plurality of information for a geographic region, wherein the plurality of information includes weather information and homeowner information; dividing the geographic region into a plurality of subregions based on the weather information and the homeowner information; determining at least one subregion of the plurality of subregions for pursuing a lead; generating, based on the plurality of information for the geographic region and for a home in the at least one subregion, a lead score for the home, wherein the lead score is indicative of a second likelihood of obtaining a repair job for the home; responsive to determining that the lead score is greater than a threshold lead score, automatically generating a materials order for the repair job, wherein automatically generating the materials order includes: analyzing materials databases associated with one or more materials suppliers; retrieving dimensional data associated with the home; and determining the materials to order and a quantity of the materials to order based on the analyzing and the retrieving; automatically determining a number of workers for the repair job; and generating a schedule for the workers to carry out the repair job.

In some embodiments, the techniques described herein relate to a system, wherein the weather information includes historical weather information and predictive weather information.

In some embodiments, the techniques described herein relate to a system, wherein each or the plurality of subregions is determined based on an intensity of a recent weather event affecting the geographic region.

In some embodiments, the techniques described herein relate to a system, wherein the instructions further include: automatically determining a campaign targeting the at least one subregion of the plurality of subregions based on the intensity of the recent weather event.

In some embodiments, the techniques described herein relate to a system, wherein the instructions further include: further responsive to determining that the lead score is above the threshold lead score, automatically assigning a project manager for the repair job, wherein the project manager is assigned based on a history of repair jobs being in geographic proximity to the repair job.

BRIEF DESCRIPTION OF THE DRAWING FIGURES

Embodiments of the present disclosure are described in detail below with reference to the attached drawing figures, wherein.

DETAILED DESCRIPTION

Embodiments of the present disclosure solve the above-described problems and provide a distinct advance in the art by providing methods and systems for generating inspection recommendations that target specific vehicle problem areas. Further, reconditioning estimates may be generated based on historical data and the vehicle focused inspection.

The following description of embodiments of the present disclosure references the accompanying illustrations that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Figure 1:
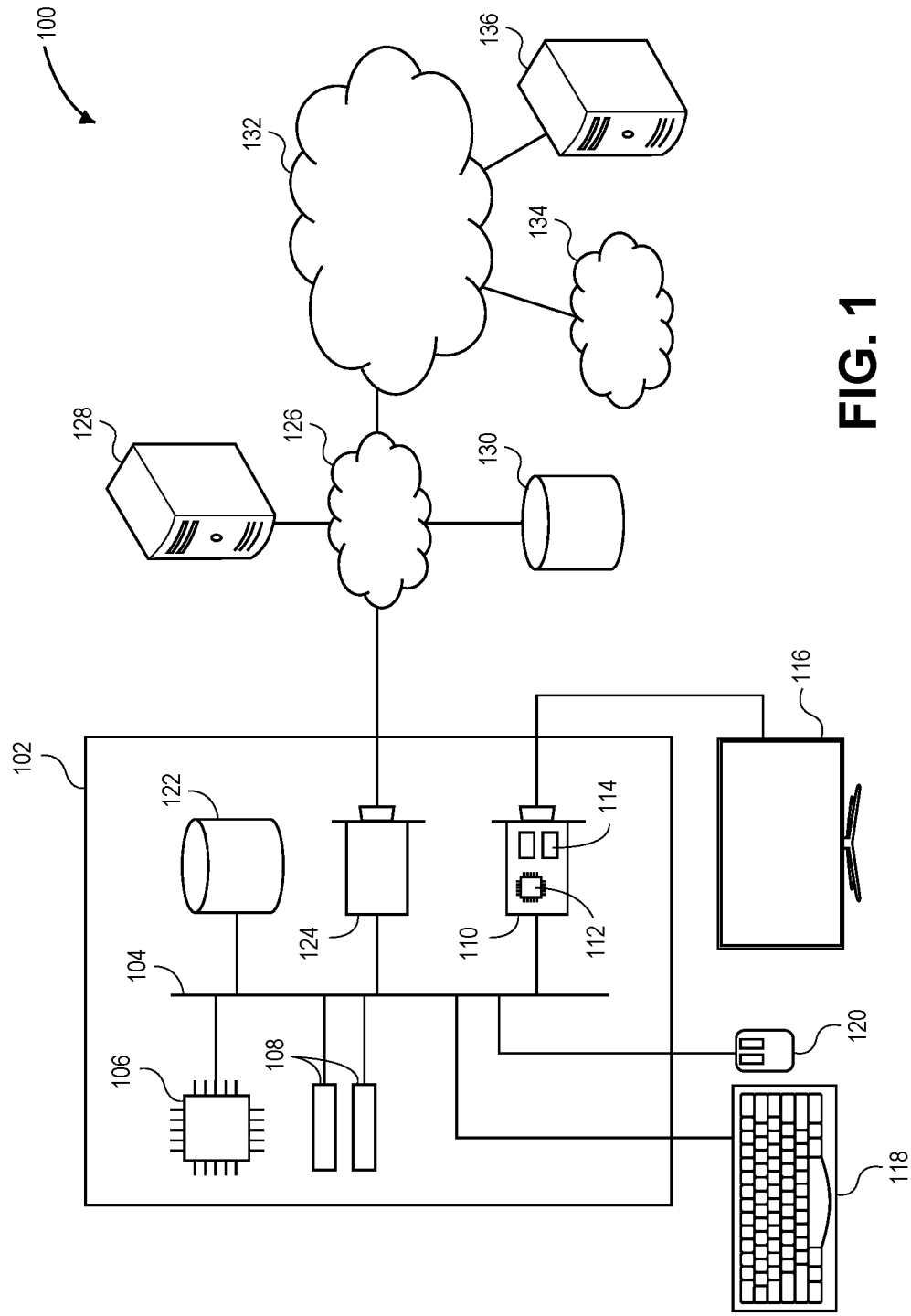
FIG. 1 depicts an exemplary hardware platform for certain embodiments of the present disclosure.

Turning first to FIG. 1, an exemplary hardware platform that can form one element of certain embodiments of the present disclosure is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 702.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Cash-flow dependent businesses, such as a roofing repair business, construction business, and other businesses, must walk a delicate balance of keeping enough materials on hand without expending too much capital on materials that will sit in a warehouse unused. Further, such businesses must also avoid the expenditure of time and resources in pursuing leads that will never be realized. Accordingly, embodiments of the present disclosure described herein are directed to systems and methods of analyzing project leads, or other potential projects, for a determination as to whether the lead will result in an accepted project. Through the utilization and analysis of multiple data points, embodiments of the present disclosure may generate recommendations, determinations, or recommendations for determining whether a lead will result in a project, whether new leads are incoming, and/or for purchasing materials or scheduling workers in preparation of new or predicted projects, among other functions.

Embodiments of the present disclosure solve the technical problem of analyzing large amounts of data from a multitude of sources to determine material requisition, pursuit of roof repair leads, marketing spend, target audiences, and channels, and the like. Embodiments of the present disclosure may improve processing time for analyzing these data inputs and generating a recommendation or other output. Furthermore, embodiments of the present disclosure aggregate a plurality of data sources into a single system that allows for the data to be more efficiently analyzed and to increase the computing efficiency at which recommendations may be generated. Machine learning techniques for predicting a value of a repair job are disclosed.

Figure 2A:
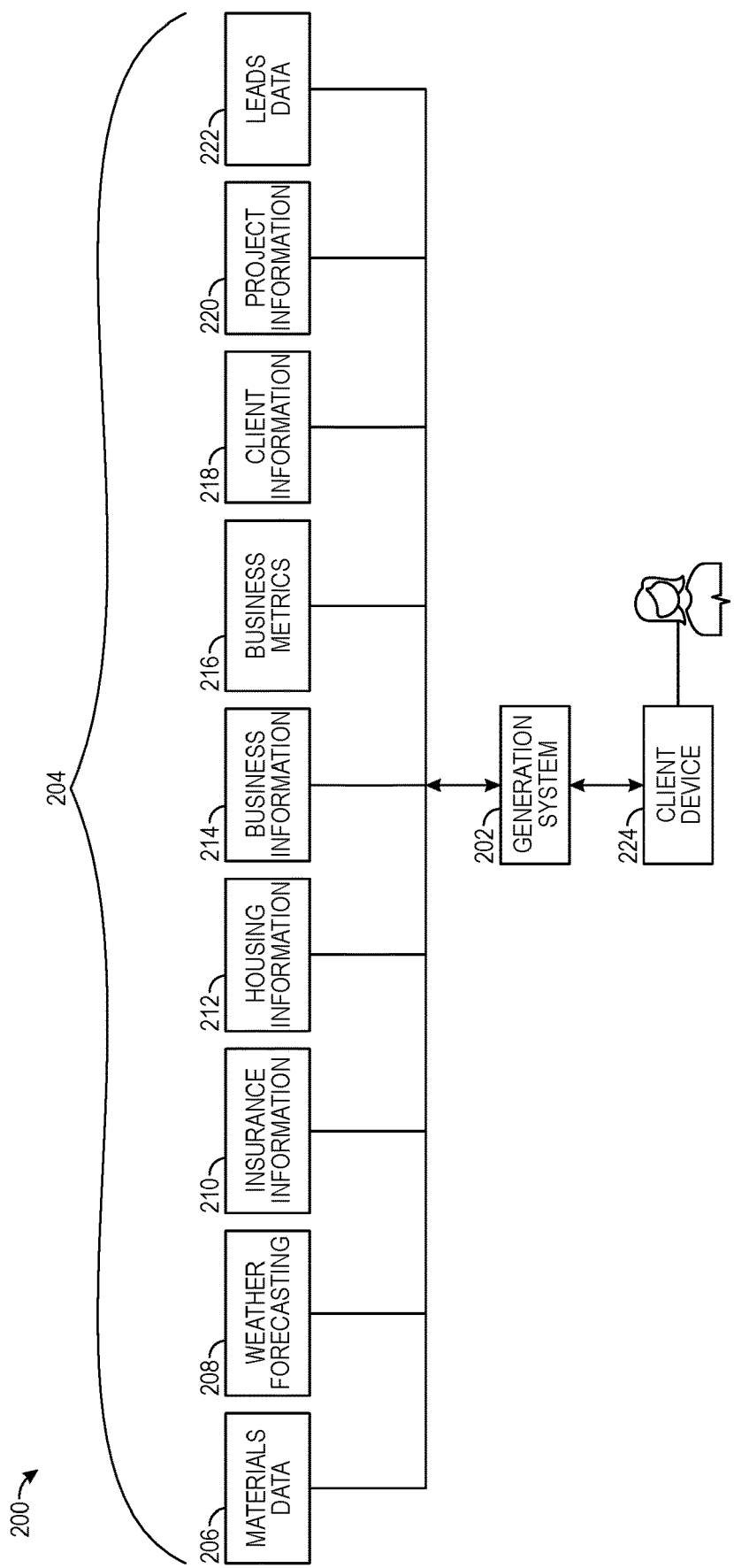
FIG. 2A depicts a system figure illustrating the elements of a system for carrying out embodiments of the present disclosure.

FIG. 2A depicts an exemplary system of obtaining inputs, analyzing the data from the inputs, and outputting recommendations for repair projects, depicted generally by reference numeral 200. In some embodiments, one or more data inputs may be obtained by system 200, such that a database of information may be stored, tabulated, analyzed, and presented to a user. Broadly, system 200 comprises a generation system 202 configured for receiving or obtaining raw data or information, analyzing the obtained information, and generating an estimate or recommendation. In some embodiments, and as described in greater detail below, the estimate or recommendation may be a generated recommendation to purchase an amount of material in preparation of one or more future repair jobs. Further, the estimate or recommendation may optionally or additionally be a generated recommendation to direct one or more workers or service providers to a region in advance of estimated repair projects. In some embodiments, generation system 202 may further comprise a machine learning algorithm which may be trained to monitor user actions or data inputs and determine trends or aid in generating a determination, recommendation, or estimate, and/or for automating certain processes.

As depicted, generation system 202 may receive raw data or information from one, or a plurality of, data inputs 204. Data inputs 204 may be raw data, collected data, stored data, or any other data or information that may be obtained and used by generation system 202 for generating a recommendation, estimate, or other determination. For example, in some embodiments, data inputs 204 may comprise materials data 206, which may be obtained by the generation system 202, such that a database of information may be stored, tabulated, analyzed, and presented to a user. Materials data 206 may comprise information directed to the types, quantities, pricing, and/or availability of one or more different types of materials or products, that may be transmitted or otherwise collected by generation system 202 which may be used in determining a recommendation for purchasing an amount and/or type of material. For example, materials data 206 may be obtained through searching and scrubbing through various online databases, such as websites selling roofing materials, for example. By scrubbing through various online databases, generation system 202 may locate sources of materials or products and identify the inventory of the various sources. Additionally, by scrubbing through various online databases, generation system 202 may determine an average price of particular products and/or materials. Through determining an average price of a particular product or material, generation system 202 may determine a source that maintains an adequate number of the product or material at an acceptable cost in relation to the average price. Accordingly, as a lead or potential project is processed, generation system 202 may utilize materials data 206 to generate a recommendation as to which source to purchase the materials required for the project from. In some embodiments, generation system 202 may further combine materials data 206 with one or more other data inputs 204 to generate a recommendation.

In some embodiments, materials data 206 may further be used to determine macro level trends, statistics, or metrics which may affect raw materials, finished products, or other facets of the supply chain. For example, generation system 202 may analyze materials data 206 and determine trends in local, national, and/or global markets for determination as to whether shortages or surpluses are likely to occur in the future. Accordingly, in response to a prediction that shortages of materials may occur, generation system 202 may generate a recommendation to purchase additional materials, even if the materials are not required in the short-term.

In some embodiments, data inputs 204 may further comprise weather forecasting information 208, comprising data or other information providing forecasting or other predictive data models directed to the weather of a particular area or region. For example, weather forecasting information 208 may be indicative of the predicted weather, such as rainfall, windspeeds, temperature, or other weather information of a selected area over a pre-selected period. In some embodiments, weather forecasting information 208 may comprise short-term weather predictions for a given area, including for example weather predictions for thirty-six hours or less. In some embodiments, weather forecasting information 208 may optionally and/or additionally comprise medium-term weather predictions for a given area, including for example, weather predictions for thirty-seven hours to one week from a selected time. In some embodiments, weather forecasting information 208 may optionally and/or additionally comprise long-term weather predictions for a given area, including for example, weather predictions for more than one week out from a selected time. Weather forecasting information 208 may be obtained through searching and scrubbing through various online databases, such as governmental websites (e.g., National Oceanic and Atmospheric Administration) or private websites (e.g., The Weather Channel), or other weather prediction websites and/or data sources. Further, in some embodiments, weather forecasting information 208 may be obtained through the monitoring weather service notifications, including for example, a severe weather warning transmitted to a client device through a push notification. In some embodiments, weather forecasting information 208 may optionally and/or additionally comprise data captured or transmitted through satellite imagery, drones, or other aerially captured images of one or more homes, buildings, or other structures. For example, following a tornado, hurricane, or other event causing damage to an area, aerial photographs or video may be taken of the area affected by the damage.

In some embodiments, the generated recommendation, estimation, or determination may be based at least in part on the weather forecasting information 208 obtained by generation system 202. By way of non-limiting example, when scrubbing through online weather databases, weather forecasting information 208 may include a weather model that a storm front is predicted to hit a large city with strong gusts of wind capable of damaging the roofs of homes. Accordingly, generation system 202 may utilize this information and generate a recommendation that a roofing repair business should purchase additional roofing materials in anticipation of an increase of repair jobs following the storm front. Consequently, responsive to the recommendation, a repair business may purchase additional materials in anticipation of a predicted increase of repair jobs.

Conversely, generation system 202 may utilize weather forecasting information 208 to recommend purchasing less than the average amount of materials to prevent an unnecessary surplus of materials. By way of non-limiting example, in a typical year a roofing repair business may order enough shingles to repair two-hundred homes in response to storms that occur during the spring months. However, if weather forecasting information 208 predicts a below-average number of storms during the spring seasons, generation system 202 may recommend to the repair business that only one-hundred and twenty homes will require repair. Therefore, the roofing business may purchase fewer materials than in an average year, preventing a surplus of materials that goes unused.

In some embodiments, weather forecasting information 208 may optionally and/or additionally include historical weather data. For example, generation system 202 may utilize historical weather data to generate a database of average temperatures, average precipitation, average wind gusts, among other climate and/or weather information for a particular region. Accordingly, as generation system 202 receives weather forecasting information 208 that is predictive of future weather forecasts, generation system 202 may compare the incoming predictive weather forecasts to the database of historical information for use in generating a recommendation or other determination. In some embodiments, generation system 202 may further combine weather forecasting information 208 with one or more other data inputs 204 to generate a recommendation or determination.

In some embodiments, data inputs 204 may optionally and/or additionally comprise insurance information 210. In some embodiments, generation system 202 may utilize data or information from one or more insurance carriers, or similar companies or businesses that process claims for damages and analyze the information to generate a recommendation or determination. Through the collecting and analyzing of insurance information 210, generation system 202 may base the recommendation or determination at least in part on the collected insurance information 210. By way of non-limiting example, in some embodiments, generation system 202 may be in communication with one or more insurance carriers or providers, with access to a database or other listing of incoming insurance claims, pending insurance claims, and/or processed insurance claims. Accordingly, in some embodiments, generation system 202 may analyze insurance information 210 to develop trends or statistics associated with one or more insurance carriers.

For example, generation system 202 may determine that an influx of insurance claims have been submitted to one or more insurance carriers and determine that an influx of repair jobs may follow. Generation system 202 may utilize this information and recommend that repair business purchase additional materials. Additionally, insurance information 210 may also be analyzed to develop or determine trends or statistics for one or more insurance carriers. For example, generation system 202 may review leads or potential projects received from an insurance carrier and determine a percentage of those potential projects that result in accepted projects. This percentage is referred to herein as the buy ratio. By way of non-limiting example, through such analysis, generation system 202 may determine that about 50% (i.e., a buy ratio of 0.5) of potential projects from Allstate® Insurance results in accepted projects, while about 75% of potential projects from Farmers Insurance® results in accepted projects. Accordingly, generation system 202 may determine that a repair business should begin purchasing materials when a potential project is received from Farmers Insurance®, but to wait to begin purchasing materials when a potential project is received by Allstate® Insurance.

As described in greater detail below, system 200 may be in communication with one or more insurance carriers, providing a direct connection for transmitting information. For example, when a homeowner submits a claim to an insurance carrier, either the homeowner or an agent of the insurance carrier will typically take a visual capture of the damage (i.e., photographs or videos) to determine the cause of the damage, the extent of the damage, among other information. In some embodiments, and to increase the response time to begin repair work on the house, information from the insurance carrier recording the damage may be uploaded or transmitted to system 200 for analysis by generation system 202.

Accordingly, generation system 202 may process the information from the insurance carrier, or in combination with other data inputs 204, and generate a recommendation or other determination. For example, an insurance claim for a damaged roof may include photographs of the building, the roof, and the shingles. Using the information from the insurance carrier, generation system 202 may determine the type of materials required for repairing the damage, how much material is needed, how many workers would be required for the project, and/or other determinations. Following the analysis, generation system 202 may generate a recommendation or determination, providing the repair business with project bidding information allowing the repair business to bid on the repair project in a timely manner. Optionally or additionally, the generated recommendation or determination may also allow the repair business to begin ordering materials or scheduling workers to respond to the repair project without delay. Further, through communication between the insurance carrier and the repair business, the processing of claims and projects may occur in a more streamlined manner, reducing latency and improving efficiency.

In some embodiments, data inputs 204 may optionally and/or additionally comprise housing information 212. Housing information 212 may be obtained by the generation system 202, such that a database of information may be stored, tabulated, analyzed, and presented to a user. In some embodiments, housing information 212 may comprise information directed to home information and/or metrics for houses, or other buildings, in a particular region or area. It will be appreciated that housing information 212 may apply to both residential buildings and commercial buildings, and housing information 212 is not intended to be limited to traditional single-family dwellings.

For example, housing information 212 may include metrics directed to the number of houses and/or buildings in a selected region, including the number and types of buildings in the region. Further, housing information 212 may optionally and/or additionally comprise additional details about the houses and/or buildings of the selected region, including for example, details about the materials used to construct the buildings. In some embodiments, housing information may also comprise historical information about the buildings of the selected regions, such as when the building was constructed, who constructed the building, history of repairs performed on the building (e.g., when the repairs were performed, what type of repairs were performed, what materials were used during the repairs, the cause of the damage that required the repairs to be made, and/or other historical information), and/or other historical information about one or more buildings. The historical information may be collected through automated methods, such as through scrubbing online databases or websites, such as databases associated with an insurance carrier or through public websites such as reality listings or other sources of information about one or more houses. Optionally or additionally, housing information 212 may be collected through public record databases, such as municipal codes, zoning ordinances, or homeowner's association covenants.

In some embodiments, housing information 212 may be gathered and saved in a database for access and use by generation system 202 in generating a determination. The data from housing information 212 may be analyzed to determine trends or timeframes for a likelihood that a building may require repair work. For example, a residential home in Kansas City, Missouri, exposed to average temperatures and weather may be expected to require a roof replacement every ten years. However, a residential home in Phoenix, Arizona, exposed to average temperatures and expected weather may be expected to require a roof replacement every fifteen years. In addition to determining trends and expected lifetime of a building based on weather and/or location, generation system 202 may further determine trends or expected lifetimes of a building based on the materials used to construct the building. For example, generation system 202 may analyze housing information 212 and determine that residential houses that have clay tiles have a longer roof lifetime than a similar residential houses that have asphalt shingles. Furthermore, generation system 202 may additionally analyze housing information 212 for determining an estimated lifetime of materials in different geographic locations and/or exposure to different climates and/or weather patterns. For example, generation system 202 may determine that a residential home in Kansas City, Missouri that has an asphalt roof may be expected to require a roof replacement every ten years when exposed to average weather conditions of Kansas City, Missouri. Generation system 202 may likewise determine that a residential home in Jacksonville, Florida that has an asphalt roof may be expected to require a roof replacement every six years when exposed to the average weather conditions of Jacksonville, Florida. The generation system 202 may analyze housing information 212 to determine how the life expectancy of different housing materials may be affected by different geographic locations, different climates, and/or different weather exposures, or any combination thereof. Accordingly, generation system 202 may generate a recommendation that is based at least in part on housing information 212.

In some embodiments, data inputs 204 may optionally and/or additionally comprise business information 214. In some embodiments, business information 214 may be obtained by the generation system, such that a database of information may be stored, tabulated, analyzed, and presented to a user. Business information 214 may comprise information directed to a business using, utilizing, or otherwise connected to generation system 202, including for example, inventory, workforce information, cash-flow, among other information. For example, generation system 202 may utilize business information 214 to determine whether the business has enough materials on hand and/or workers available to bid on a project.

In some embodiments, business information 214 may comprise inventory information about the inventory or materials that a repair business has in stock, or otherwise available to respond to a bid or project. Accordingly, if a new project arises, or if a business desires to bid on a project, generation system 202 may review the inventory of the business and generate a determination as to whether the business has enough materials on hand to complete the project. In generating the determination, generation system 202 may provide a recommendation, such as recommending that the business has enough materials on hand to perform a potential project or alternatively, that the business does not have enough materials on hand to perform the potential project.

In some embodiments, business information 214 may optionally and/or additionally comprise employee or workforce information about one or more businesses, which generation system 202 may utilize in formulating a determination, estimate, or recommendation. For example, the employee information may include the number of employees that a business currently employs. Employee information may also include information about specific workers or employees, including for example, education or training background of employees, certifications, licenses, or other qualifications of employees, or other information indicative of skills or specializations. Employee information may optionally and/or additionally comprise scheduling or workload information about one or more employees or workers. For example, a repair business may catalog and track employee schedules, which may help in determining workload capabilities for current and/or future projects. Additionally, the geographic location or distribution of workers or employees, including the number of workers in a specific location, may also be tracked and recorded, which may help in determining capabilities for responding to projects. The location of workers may be tracked through the monitoring of worker's schedules or through GPS or other location positioning services.

Through the monitoring of schedules and/or workload, generation system 202 may determine whether a business has sufficient workers to bid on new projects or to accept new projects. Further, through the tracking of worker's credentials and/or backgrounds, generation system 202 may further determine which workers or employees are best suited to respond to an incoming project or for scheduling future projects. Even further, through the tracking of the location of workers, or groups of workers, the generation system 202 may use the location information to determine if a business may respond to a project in a particular region. For example, a large repair business employing a large number of employees may divide its workforce into groups or teams based on specialty. If a new project, or an inquiry about a project, is received by the business, generation system 202 may analyze the project request and compare the project request to the employee information. For example, the generation system 202 may receive a project request for a roofing repair project in Kansas City, Missouri. Responsive to receiving the request, generation system 202 may access and review employee information and determine if there is a sufficient number of workers located in or near Kansas City, Missouri and whether the employees that are in or near Kansas City, Missouri have the experience or background in roofing repair to adequately respond to the repair project. Accordingly, generation system 202 may recommend that a group of workers are able to respond to and/or perform the repair project as outlined by the project request, with the recommendation generated at least in part on the employee information. As described in greater detail below, in some embodiments, following the generated determination or recommendation, system 200 may automatically begin purchasing materials or scheduling workers to a location in preparation of a project.

In some embodiments, data inputs 204 may optionally and/or additionally comprise business metrics 216. In some embodiments, business metrics 216 may be obtained by the generation system 202, such that a database of information may be stored, tabulated, analyzed, and presented to a user. Business metrics 216 may comprise analytical, statistical, or other metric-based data related to one or more businesses associated with generation system 202. Generation system 202 may utilize business metrics 216 for generating a determination, estimate, or recommendation. By way of non-limiting examples, the statistics and/or metrics of one or more businesses may be tracked for determining trends or tendencies of a business, including, for example, the time it takes the business to complete a project, the amount of material required to complete a project, a minimum number of workers required for a project, the optimum number of workers for a project, among other information that can be tracked and analyzed.

In some embodiments, business metrics 216 may be selectively tracked and organized at a macro level, a micro level, or both. By selectively tracking and analyzing data at a macro level, trends or statistics may be determined at a business-wide, or even industry-wide level. By way of non-limiting example, at a macro level, business metrics 216 may comprise captured or entered information directed to business wide information, such as the number of employees of a business; any divisions, groups, or teams of the business (such as specialty groups or project specific teams); the number of projects the business has handled and/or is currently handling; the number of unique clients that a business has; the number and type of projects from clients; the date that new projects are submitted and/or accepted; among other macro-level statistics or data points. Optionally or additionally, at a micro level, business metrics 216 may comprise captured, or entered information, directed to specific projects, or types of projects, including for example: information, statistics, or data points, such as the amount and type of materials required to complete specific types of repair projects; the number of employees or workers required to complete specific types of repair projects; the number of aggregate hours required to complete specific types of repair projects; among other micro-level statistics or data points.

Accordingly, through the tracking of statistics and trends at the macro level, the micro level, or both, generation system 202 may determine or tabulate certain trends or statistics that may be used when generating a determination, estimate, or recommendation. For example, through collecting, analyzing, and/or utilizing business metrics 216, generation system 202 may use the business metrics 216 when generating a determination. For example, generation system 202 may determine that there is a spike of roofing repair projects in the springtime, and accordingly, generation system 202 may recommend to a business to purchase additional shingles or other roofing materials in February in anticipation of an influx of projects. By way of another non-limiting example, generation system 202 may use business metrics 216 in generating a determination with respect to employees or workers including determining an average number of workers or employees that are typically required for a roof replacement project. In some embodiments, at a macro level roofing repair businesses often hire workers on seasonal or other temporary basis as projects typically spike and fall during specific times of the year. Through analyzing and utilizing business metrics 216, generation system 202 may recommend to a business to hire additional workers in preparation of a spike of new projects. At a micro level, as new project opportunities arise, generate system 202 may utilize business to determine if the business has the capacity and sufficient number of workers to respond to the new project.

In some embodiments, data inputs 204 may optionally and/or additionally comprise client information 218. Client information 218 may be obtained by the generation system 202, such that a database of information may be stored, tabulated, analyzed, and presented to a user. For example, client information 218 may comprise information about one or more clients, or potential clients, that generation system 202 may utilize when generating a determination or recommendation. Client information 218 may comprise general information about one or more clients, such as the names of the client, contact information, billing information, among other general information. Optionally and/or additionally, client information 218 may comprise client specific information about unique clients, including for example specific information that may be captured by or entered into generation system 202. By way of non-limiting example, the client information 218 of a particular client may include information about the number of projects requested by a client, the number of projects completed by the business for a client, the type of project requested by the client, the amount clients have paid to a business for repair services, new clients received by a referral from an existing client, among other information. Optionally and/or additionally, client information 218 may comprise statistical information about one or more clients, which may be captured, collected, and analyzed by generation system 202. By way of non-limiting example, through the analysis of client information 218, generation system 202 may determine trends, metrics, or other statistics about one or more clients. For example, generation system 202 may determine the ratio or percentage of project requests that result in accepted projects on a client-by-client basis; the average time it takes for a client to pay invoices or other payments for repair services; among other statistics about clients.

In some embodiments, generation system 202 may utilize client information 218 when generating a determination. By way of non-limiting example, if a repair business receives multiple repair project requests from multiple clients, generation system 202 may access and analyze client information 218 and generate a recommendation to the repair business on how to proceed. Generation system 202 may determine that the repair business has the materials and workers available to accept each project from each of the clients and generate a recommendation reflecting the same. Alternatively, generation system 202 may determine that the repair business only has the materials and workers available to accept one (or a subset) of the incoming projects and accordingly, may make a recommendation as to which project(s) the repair business should accept. In some embodiments, generation system 202 may give more weight or consideration to certain information or data comprising the client information 218. For example, a legacy client, or a client that has been a long-time client of the repair business may be given additional consideration over a new client, or a client that only occasionally requests services from the repair business. Accordingly, generation system 202 may take this factor in account, and recommend the repair business accept the project from the legacy client, even if the repair business may have a smaller profit margin than if the repair business accepted a project from one of the other clients.

In some embodiments, data inputs 204 may optionally and/or additionally comprise project information 220. In some embodiments, project information 220 may be obtained by the generation system 202, such that a database of information may be stored, tabulated, analyzed, and presented to a user. Project information 220 may comprise information about potential or accepted projects, including the technical aspects of particular projects. For example, in some embodiments a client may provide the specifications or requirements for a repair project, or alternately, potential projects may be obtained from an insurance carrier processing claims. The specifications for the project may include, but are not limited to, what type of repair project, the dimensions or size of the project, the date the project is requested to begin, a deadline of completing the project, or other information that a client may provide to define the scope of the project. In some embodiments, project information 220 may optionally and/or additionally comprise additional details, such as a client's preferred brand of materials or types of materials. As described in greater detail below, in some embodiments, project information 220 may be provided through the user interface of a dedicated software accessible by clients, repair businesses, insurance carriers, manufacturers, and/or other parties.

In some embodiments, data inputs 204 may optionally or additionally comprise leads data 222. In some embodiments, leads data 222 may be obtained by the generation system 202, such that a database of information may be stored, tabulated, analyzed, and presented to a user. Leads data 222 may comprise information about the sources of projects and/or the sources of project drivers, including data, metrics, statistics, or information about how a business receives project bids from potential clients. Non-limiting examples may include but are not limited to, analytics from advertising campaigns, such as television ads, radio ads, print ads, or other forms of traditional media; online advertising analytics, such as Google® analytics or other web-based tracking methods; customer surveys; and/or other sources of information. Generation system 202 may analyze leads data 222 to determine trends or breakdowns of how different sources of drivers perform. For example, through analysis, generation system 202 may determine the source of leads, which in turn, may also provide the information for determining a return on investment for particular drivers. By way of non-limiting example, generation system 202 may determine that leads from televisions commercials result in a lower percentage of accepted projects than from leads that come from online sources. Accordingly, in some embodiments, generation system 202 may determine that a business should invest more marketing capital in online advertising than television advertising. In further embodiments, generation system 202 may break down leads data 222 in even greater granularity, for determination as to which leads results in the largest return on investment. By way of non-limiting example, generation system 202 may break down leads from online advertising analytics and determine that more realized projects come from Google® sources than from Bing® sources. Accordingly, generation system 202 may recommend to the business to invest more marketing capital in Google® sources than Bing® sources.

As further depicted in FIG. 2A, system 200 may comprise a client device 224, which may provide an access point for a user to interact with system 200. Client device 224 may be any of the client devices described above with respect to FIG. 1. In some embodiments, generation system 202 may utilize data inputs 204 to generate a recommendation, determination, or estimate to a user, and provide the generated recommendation, determination, or estimate to the user via client device 224. The user may then act accordingly based on the generated recommendation, determination, or estimate.

Figure 2B:
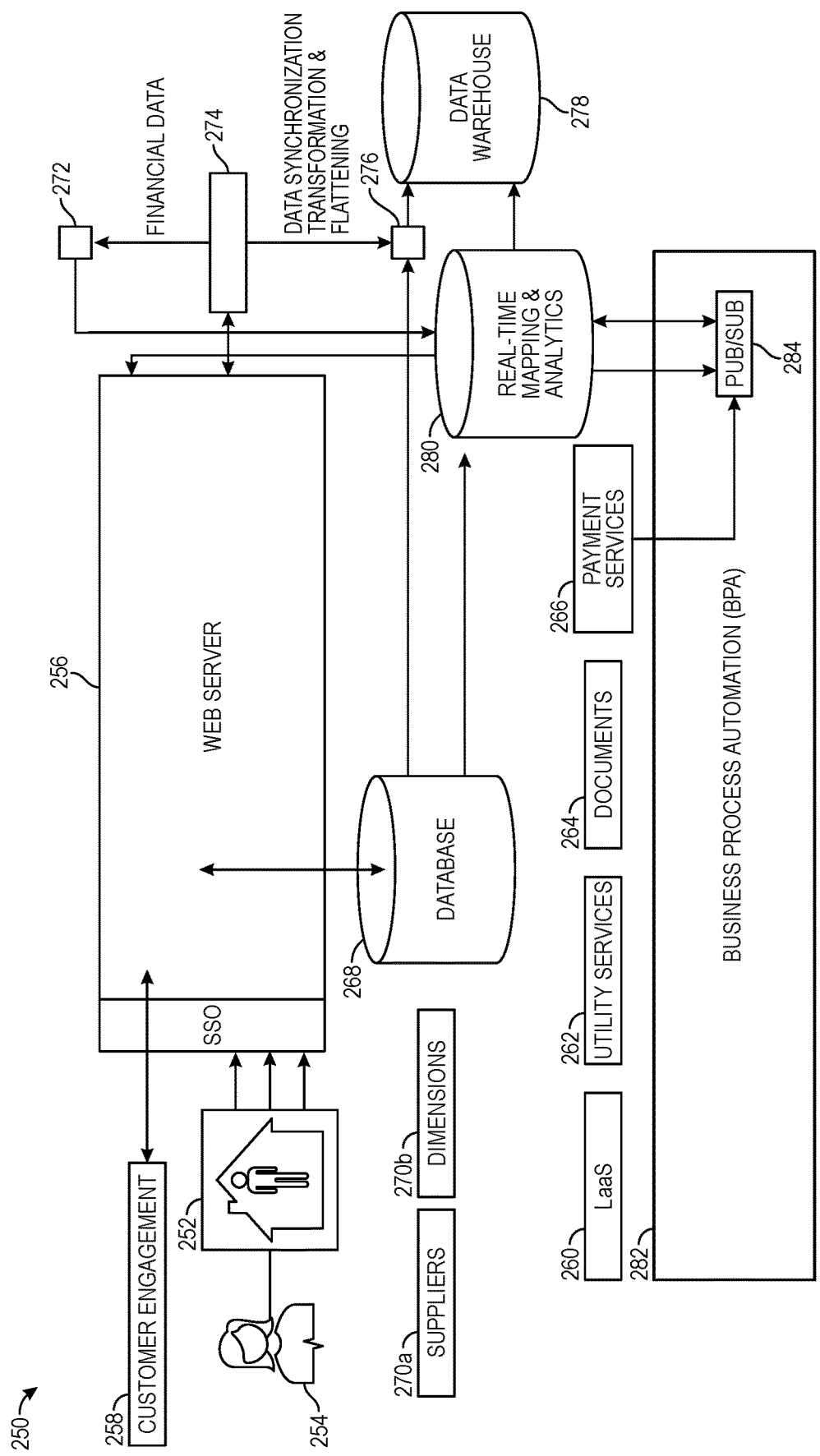
FIG. 2B depicts a system architecture relating to embodiments of the present disclosure.

FIG. 2B illustrates a system architecture 250 for some embodiments of the present disclosure. System architecture 250 may generally correspond to a back end for a customer relationship management system that may correspond to system 200. That is, any of the data inputs 204 discussed above may be received, processed, analyzed, etc. by system architecture 250.

System architecture 250 may comprise a client portal 252. Client portal 252 may be configured as the front-end of system architecture 250 via which a user 254 may interact with elements of system architecture 250. User 254 may represent a homeowner who is having their roof repaired, for example. Various user interfaces that may be displayed as part of client portal 252 are discussed further hereinafter.

Client portal 252 may be coupled to a web server 256, which may comprise one or more servers and may be implemented as a platform-as-a-service. Web server 256 may comprise or otherwise be associated with various components. For example, databases, APIs, data visualization tools, and the like may be provided by, requisitioned from, or otherwise associated with web server 256.

A client engagement module 258 may also be communicatively coupled to web server 256. Client engagement module 258 may comprise various communications integrations accessible by user 254. For example, communications integrations that allow for two-way communication between user 254 and a project manager, an insurance agent, a materials supplier, or the like may be provided. Accordingly, user 254 may use client portal 252 to communicate with their project manager while the project manager may use a personal computing device to communicate with user 254. The two-way communication may be implemented using a service such as Twilio, for example.

System architecture 250 may comprise various other integrations. For example, a loyalty-as-a-service (LaaS) integration 260, a utilities integration 262, a documents integration 264, a payments integration 266, or any combination thereof may be present in some embodiments. LaaS integration 260 may comprise a loyalties services integration that provides incentives for users to utilize system architecture 250. Utilities integration 262 may comprise various utility integrations, such as messaging services, PDF services, email integrations, and the like, allowing user 254 to interact with these utilities within utilities integration 262. Documents integration 264 may comprise various documents related integrations. Payments integrations 266 may comprise various payment services, allowing user 254 to make payments for repair jobs within client portal 252.

As shown, web server 256 may be communicatively coupled to a first database 268. First database 268 may be a cloud database configured to store and/or retrieve supplier data 270*a*, dimensional data 270*b*, or any other data for system architecture 250. In some embodiments, supplier data 270*a* comprises materials supply data and may be used by system architecture 250 to determine whether to buy materials from a certain supplier, how much material to order, and the like, as discussed with respect to FIG. 2A. Supplier data 270*a* may represent data retrievable from one or more distinct materials suppliers. For example, an admin user may specify specific companies for ordering materials from, and first database 268 may retrieve data from the specified companies for analysis thereof as discussed above. Likewise, dimensional data 270*b* may comprise dimensional data for a building that is retrievable for calculating material needs for one or more buildings. For example, first database 268 may retrieve data from EagleView™ for a house to determine the materials needed to replace a roof on the house. The dimensional data may then be used to determine the materials to order, as previously discussed.

In some embodiments, system architecture 250 is configured to retrieve dimensional data 270*b* for a plurality of homes in a region and to order materials based on a prediction that a number of the homes in the region will require a roof repair. For example, responsive to weather forecasting indicating a severe hailstorm is forthcoming, system architecture 250 may calculate lead scores (discussed further below) for homes in the region. The lead scores may be compared to a threshold to determine a likelihood that a home will request a roof repair. System architecture 250 may then estimate that a subset of homes with a lead score over the threshold will actually contract the company to repair their roof. For example, system architecture 250 may estimate that 50% of the homes with the lead score over the threshold will contract the company for the repair job. Accordingly, system architecture 250 may order the materials to repair 50% of said homes. Machine learning and other artificial intelligence techniques may be used to train system architecture 250 on preemptively ordering materials before a severe weather event, as will be appreciated by one of skill in the art.

Web server 256 may also be communicatively coupled to an accounting module 272 for storing and/or retrieving financial data. Financial data from accounting module 272 may be transmitted to a data synchronization module 274 and therefrom to a data pipeline 276. Data synchronization module 274 may be an integration platform such as Pipedream that is configured to perform data synchronization, transformation, flattening, or any combination thereof of the financial data. From data synchronization module 274, the adjusted data may be passed to data pipeline 276, which may pull all data from system architecture 250 and transmit the data to a data warehouse 278. As shown, data pipeline 276 may receive data from first database 268.

System architecture 250 may also comprise a second database 280, which more store real time mapping and analytics data. Second data base 280 may be communicatively coupled to first database 268 and may also transmit data to data pipeline 276 and/or data warehouse 278. Second data base 280 may be coupled to a business process automation module 282. Business process automation module 282 may comprise a publication/subscription module 284. Pub/sub module 284 may be communicatively coupled to second data base 280.

Process Overview

Figure 3:
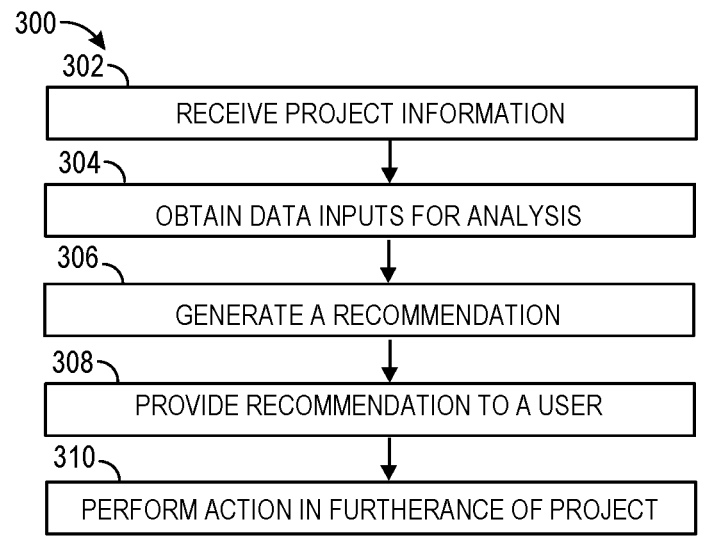
FIG. 3 depicts a flow chart illustrating the operation of the system in accordance with embodiments of the present disclosure.

FIG. 3 depicts an exemplary method of analyzing data inputs 204 and generating a determination, estimate, recommendation, or any combination thereof generally referenced by reference numeral 300. In some embodiments, method 300 may be initiated by a potential project or lead submitted by a client; a project from an insurance carrier; or from a business operation inquiry prompted by a business for which generation system 202 may review and analyze to generate a recommendation, determination, or estimate that is specific to the project or lead. For example, a roofing repair project may be submitted by a homeowner to a roofing repair business, prompting method 300 to begin. In further embodiments, method 300 may be initiated automatically by generation system 202, including for example a systematic review of a business inventory in preparation of a spike of projects. Accordingly, an initial step 302 may comprise, the beginning of a project, which may comprise defining the scope of the project.

Next, at step 304, information may be obtained or gathered for analysis. In some embodiments, the obtained information may be any of the data inputs 204 that are described above with respect to FIG. 2A, including materials data 206, weather forecasting information 208, insurance information 210, housing information 212, business information 214, business metrics 216, client information 218, project information 220, leads data 222, or any combination thereof. For example, if the project is a one-off project proposed by a potential client, the obtained data inputs 204 required for an analysis may be fewer than the data inputs 204 required for a repair business determining the amount and type of materials to purchase for an upcoming work cycle. The information may be obtained using any of the above-described methods, and for example, the information may be obtained through the scrubbing of online resources, the manual entering of data or information, or data received from an external database or storage, or any other method of information gathering.

At step 306, the above-described data inputs 204 may be analyzed to generate a recommendation, estimate, or other determination based at least in part on the project and the obtained data inputs 204. Any algorithms described in embodiments above may be used to analyze and compare the data inputs 204. In some embodiments, the data inputs 204 may be analyzed by generation system 202 as described above, providing for an automated process of analysis.

At step 308, following the analysis of the data inputs 204 and the generation of the recommendation, estimate, or determination, the generated recommendation, estimate, or determination may be provided to a user. The generated recommendation, estimate, or determination may be displayed to a user via the display of a computing device, such as the client devices described above. The generated recommendation and/or determination may be based at least in part on the data analysis described above with respect to step 306. For example, a recommendation may be generated and provided to a repair business recommending the business purchase a specific quantity of a particular brand and type of roofing shingles necessary to complete a proposed project. By way of another non-limiting example, the generated recommendation may be a recommendation to the repair business to proceed with caution or decline a proposed project from a particular client. For example, data inputs 204 may comprise client information 218 about the client's payment history. The generation system 202 may determine that the client is routinely late to pay invoices, and using this information, may recommend to the business to proceed with caution with the client, or outright decline the project. It will be appreciated however that the generated recommendation, estimate, or determination may be directed to any aspect of the potential project or the business operations of the repair business or any other associated party.

In some embodiments, method 300 may comprise an optional and/or additional step 310, which may be an automatic advancement of method 300. In some embodiments, at step 310, system 200, or another computer component as described above, may automatically begin the process of starting a project or advance an existing project. For example, after reviewing weather forecasting information 208, generation system 202 may determine that an area is in the path of a severe weather front and a large influx of new projects is expected to occur. Responsive to this determination, a component of system 200 may automatically order materials and/or automatically schedule workers or employees to travel to the area in the path of the severe weather.

In some embodiments, an administrator or manager-level employee may grant certain authorizations or permissions to generation system 202, or another component of system 200, providing the conditions for automating processes of business operations. In some embodiments, conditions may be provided setting instructions or limitations for when system 20 may automatically purchase materials. For example, instructions may be provided that if certain materials are below a certain price threshold, system 200 may purchase a pre-determined amount of materials. In some embodiments, system 200 may be programmed or otherwise instructed to purchase materials in response to a determination that the likelihood of a new project will be accepted is above a certain threshold. For example, as new projects bids or bid proposals are entered, generation system 202 may analyze the potential projects using the data inputs 204 as describe above and may define or establish likelihoods that the potential projects will be realized or accepted. In some embodiments, and after the analysis, generation system 202 may assign a score, rating, or other indicator of a likelihood that a potential project will be accepted or otherwise come to fruition. By way of non-limiting example, generation system 202 may assign an incoming or proposed project a numerical score, such as a score from 1-100, on a likelihood that a project will come to fruition. In some embodiments, a minimal score threshold may be required before system 200 automatically purchases materials for the project. For example, in some embodiments, a minimum score of at least 75 may be required before system 200 automates the process of purchasing materials for the project. It will be appreciated that in some embodiments, projects may be assigned different values in additional to or in place of a numerical score. For example, a descriptive indication may be attached to a proposed or incoming project, such as a low likelihood, medium likelihood, or high likelihood of a project will come to fruition.

In some embodiments, upon a determination that an incoming project or event has a pre-determined likelihood of occurring, system 200 may automate one or more business operations. For example, upon a determination that an incoming project is likely to be accepted, step 310 may comprise system 200 purchasing materials that are determined to be required for the project. Using the above-described methods, system 200 may locate online websites for purchasing materials at the lowest price point. By way of another non-limiting example, upon a determination that an incoming project is likely to be accepted, step 310 may comprise system 200 scheduling workers or employees to begin traveling to the project location. For example, using weather forecasting information 208 as described above, system 200 may determine, with a pre-determined level of confidence, that an incoming stormfront will result in at least one repair project. Accordingly, system 200 may begin scheduling one or more employees or workers to travel to the area that is predicted to be hit by the stormfront, reducing the response time and allowing the workers to begin repairs in a timely manner.

In some embodiments, one or more aspects of the teachings described herein may be accessible through the user interface of a dedicated software platform. For example, in some embodiments, it may be advantageous for one or more parties to a transaction, or multiple transactions, to connect through a single dedicated software platform, providing for a streamlined process for clients, repair businesses, manufacturers, and sellers, or any combination thereof. The software platform may comprise a dashboard comprising various panes, displays, windows, or other components for receiving and displaying information, which may be customizable to suit the needs of the user. For example, the dashboard for a repair business may comprise displays or components tailored for providing information about current projects, including the status of the projects, how many workers are dedicated to the project, the costs associated with the project, among other information. The information about current projects may aid the repair business in keeping track of the resources that are currently being expended, which may aid in how the repair business may accept projects in the future. The dashboard for a prospective client may likewise be tailored for providing an interface for the client to upload information about a prospective project and for selecting a repair business to perform the project. For example, the dashboard for the client may include an entry box or other means to provide the client an ability to upload pictures or videos of damage to the client's home. The dashboard may further comprise a means for text entry, allowing the client to provide written details or description of the project, including for example the location of the house, the date the project should begin, the date the project should be completed by, or other instructions.

In some embodiments, the software platform may further provide methods for communication between two or more of the parties utilizing the software platform. For example, after a client has entered the details of the project, one or more repair businesses may provide a bid on the project, which may be presented to the client. The client may then choose which repair business to grant the project to. Further, if insurance carriers are included in the process, the insurance carriers may also access the software platform, streamlining the process of approving insurance claims. By way of another non-limiting example, the dashboard may further allow communication between parties that are ancillary to the direct project bidding process between a repair business and a client. For example, manufacturers may utilize the dedicated software platform and may be presented information that is prevalent to a manufacturer. For example, predicted spikes in repair projects may be presented to manufacturers, alerting the manufacturers when to increase production of materials or other repair products. Similarly, predicted dips in repair projects may be presented, alerting manufacturers when to decrease production. Further, in addition to general spikes, dips, or other predicted trends, additional details may also be presented to manufacturers or other parties using the software platform. For example, using the methods described above, generation system 202 may determine that a location may be hit by a large stormfront, resulting in a spike of repair projects. Accordingly, information may be presented through the software platform to manufactures or suppliers to send materials to the location that is predicted to be hit by the stormfront.

Figure 4:
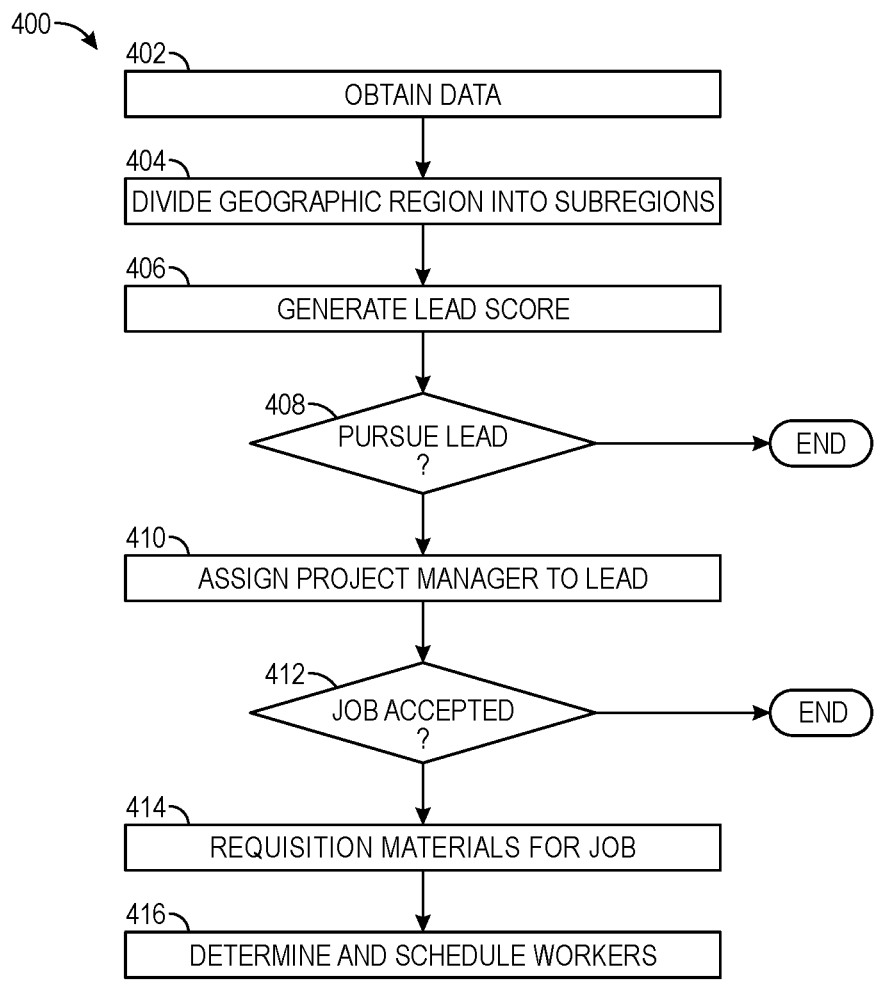
FIG. 4 depicts a flow chart illustrating determination of a lead score for embodiments of the present disclosure.

FIG. 4 illustrates a method 400 in accordance with embodiments of the present disclosure. Method 400 presents an overview of how obtaining and carryout a roof repair in accordance with embodiments of the present disclosure.

At step 402, data inputs may be obtained. Step 402 may be substantially similar to step 304 discussed above. In some embodiments, step 402 comprises receiving any of the data inputs 204 discussed above. In some embodiments, step 402 comprises obtaining at least weather forecasting information 208 and housing information 212 for a specific geographic region. For example, a town, city, country, metro area, state, or any other geographic region (optionally defined and bounded by a user) may be analyzed. For example, a metro region may be analyzed, and weather data and housing information for the metro region may be obtained. The weather data may be historical and/or predictive weather data.

Next, at step 404, the geographic region may be divided into a plurality of subregions. In some embodiments, the geographic region is divided into the plurality of subregions based on weather forecasting information 208. For example, historical weather data may indicate that a first sub-geographic region in a geographic region experienced a more intense hailstorm than a second sub-geographic region in the geographic region. Furthermore, housing information may indicate that a third sub-geographic region that experienced the same hailstorm as the first sub-geographic region comprises older homes that may be more likely to have need of roof repairs. Accordingly, the systems and methods disclosed herein may divide the geographic region into the three sub-geographic regions and indicate that buildings in the third geographic region are most likely to require roof repairs, while buildings in the first geographic region are least likely to require roof repairs. Generally, any method for determining a likelihood of a building within a geographic region or a sub-geographic region is within the scope hereof. In some embodiments, the subregions are determined based in part on lead scores. For example, if the region as a whole experienced generally the same amount of hail (or other severe weather), the subregions may be determined based on homes in geographic proximity having higher lead scores than other homes.

Next, at step 406, a lead score may be generated for a building in the sub-geographic region. The lead score may be indicative of a likelihood that a building is in need of a roof repair and/or a likelihood that the building owner/manager will accept a bid for a roof repair on their building. In some embodiments, the lead score is determined by analyzing a plurality of attributes and weighting the attributes by a weighted factor. The attributes may generally be categorized into three categories that are associated with the building owner and/or the building itself: (1) financials, (2) demographics, and (3) building value. Each attribute may be assigned a weight and a value score, and the weighted factor may be obtained by multiplying the weight with the value score. Generating a lead score is discussed further below with respect to FIG. 5.

Thereafter, at test 408, it may be determined whether to pursue the lead. In some embodiments, determining whether to pursue the lead is based on a threshold and/or bucketing as discussed below (e.g., if the lead score falls within and/or above a predefined range). If it is determined that the lead should be pursued, processing may proceed to step 410. If it is determined that the lead should not be pursued, method 400 may terminate.

Next, at step 410, a project manager or any other worker may be assigned to the lead. In some embodiments, the project manager is assigned based on historical information associated with the project manager, data associated with the building owner, data associated with the building, or any combination thereof. For example, the project manager may be determined based on recent projects that the project manager has managed that are in proximity to the location of the building. The availability of the project manager may also be taken into account such that unavailable project managers are not considered for assignment and/or prioritized less for assignment to a lead. In some embodiments, the project manager is manually assigned.

Next, at test 412, it may be determined whether a job associated with the lead has been accepted or is likely to be accepted. The job being accepted may be determined based on a report from the project manager, the customer submitting a request for the job, or the like. In some embodiments, test 412 is satisfied if it is determined that the job score is likely to be accepted. For example, if the lead score is above a threshold percentile (e.g., in the 95th percentile), test 412 may be satisfied even if the job has yet to be created. Various machine learning and artificial intelligence techniques may be used in accordance with embodiments hereof to determine when a lead score may be indicative of a job likely being accepted. If it is determined that the job is not accepted (or, in some embodiments, is not likely to be accepted), method 400 may terminate. Such a determination may be made based on a report from the project manager and/or based on an amount of time elapsing from the lead score generation and/or contact being made with the building owner. Other methods of determining whether a job is (likely) accepted or is not (likely) accepted are within the scope hereof.

If it is determined that the job is likely to be accepted, processing may proceed to step 414. At step 414, materials for the job may be requisitioned. Requisitioning materials for the job may be based on materials data 206 and housing information 212 as previously discussed. Furthermore, the buy ratio may influence the purchasing of materials in some embodiments. In some embodiments, requisitioning the materials comprises ordering the materials based on the building dimensions. In some embodiments, requisitioning the materials comprises generating an order for the materials which may then require user input to place the order. In some embodiments, requisitioning the materials comprises determining where pre-purchased materials have been stored and automatically scheduling a delivery of the materials to the building and/or an appropriate location. In some embodiments, test 412 is omitted, and materials may be requisitioned based on the lead score.

Thereafter, at step 416, workers for the job may be assigned, scheduled, and dispatched. In some embodiments, workers are assigned based on availability and proximity to the job location. The workers may be automatically assigned and scheduled to carry out the job without any further input required by the end user. If it is determined that the job cannot be carried out at the proposed time based on worker availability, the system 200 may automatically attempt to reschedule the job, subcontract the job, or perform other corrective measures as will be appreciated by one of skill in the art.

Lead Score

Figure 5:
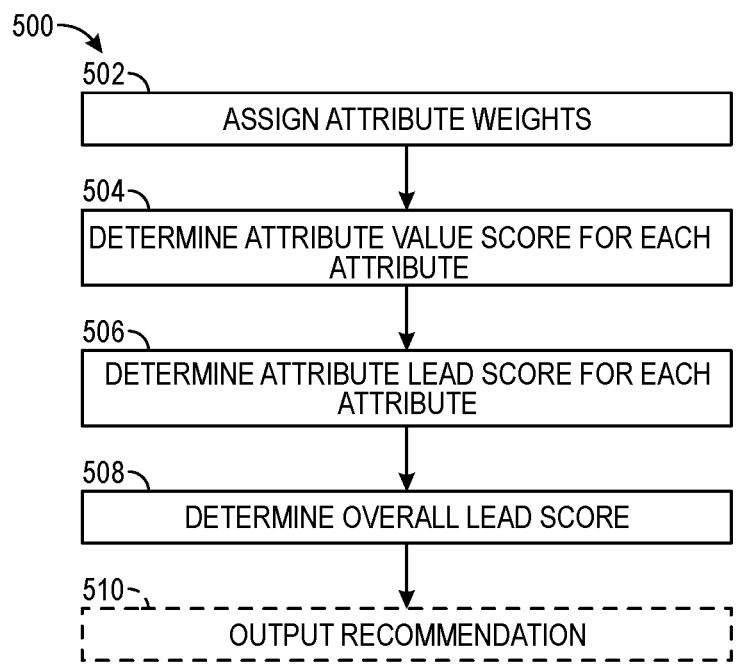
FIG. 5 depicts a flow chart illustrating the operation of the system in accordance with embodiments of the present disclosure.

FIG. 5 illustrates a method 500 for generating lead scores for a lead for some embodiments of the present disclosure. A lead, as used herein, is a potential repair job. The lead may be associated with a lead score and with the homeowner of the building for the repair job. In some embodiments, a lead score is a metric indicating a likelihood that a homeowner will obtain a roof repair. In some embodiments, the lead score is a metric indicative of a potential benefit of pursuing a lead. For example, smaller homes may have lower lead scores than larger homes because the larger homes will have more roof that needs repairing and, in turn, may be a more profitable repair job to pursue.

Lead scores may be utilized by the system 200 to determine whether to invest resources into pursuing a lead to potentially secure a roof repair job. For example, a lead score above a threshold may indicate that a lead is worth pursuing, while a lead score below the threshold may indicate that the lead is not worth pursuing. Furthermore, lead scores may be analyzed at a macro level to adjust the processing of system 200. For example, if lead scores for an area that has experienced recent severe weather are low, system 200 may generate a recommendation to adjust the marketing towards that region to obtain more leads. Because it is likely that buildings in the area are in need of roof repairs due to the severe weather, increasing the marketing may increase the likelihood that those building owners will request a roof repair.

In some embodiments, the lead score is determined by analyzing a plurality of attributes, determining an attribute lead score for each of the plurality of attributes, and summing the attribute lead scores to obtain the lead score. Each attribute lead score may be determined by calculating an attribute value score and multiplying the attribute value score by a weight. The attribute value score and the weight for each of the plurality of attributes may be on the same scale for each attribute. For example, each attribute may be assigned a weight of 1 to 20, indicating an importance of the attribute within the overall lead score, and each attribute value score may be on a scale of 1 to 10.

As one example, an attribute may be the square footage of the building, which may be assigned a maximum weight (e.g., 10), and the value score may assign a high value to buildings with large square footages and a low value to buildings with small square footages. Because larger surface areas indicate large roofs and, therefore, a larger job, the square footage attribute is assigned the maximum weight. To determine the value of the square footage attribute within the lead score, the value score may first be determined. The value score may be determined algorithmically. For example, the user may define an algorithm that buildings with square footages under a first threshold (e.g., less than 3000 sq. ft.) are assigned a value score of 1, buildings between the first threshold and below a second threshold (e.g., greater than 3000 sq. ft. and less than 5000 sq. ft.) are assigned a value score of 3, while buildings with a square footage above the second threshold are assigned a value score of 5. Accordingly, to obtain the value of the square footage attribute, the weight may be multiplied by the value score as determined by the algorithm.

Thus, the lead score may be determined by analyzing the plurality of attributes, determining the score for one or more of the attributes, and summing the score for each of the one or more attributes. The lead score may then be compared to a threshold to determine whether the lead should be pursued as discussed above with respect to FIG. 4. Leads falling below a threshold may not be followed up on, while leads above the threshold may be followed up on. It will be appreciated that more than one threshold may be used for categorizing lead scores. For example, lead scores could be bucketed into highly unlikely, unlikely, likely, and very likely buckets.

Method 500 for determining a lead score for a lead may begin at step 502, where attributes may be assigned a weight. Weights may be assigned by a subject matter expert, determined by analytically, such as by a machine learning model, or any combination thereof. For example, a machine learning model may output attribute weights that are then fine-tuned by the subject matter expert. Attributes may relate to financial information associated with the home and/or homeowner, demographic information of the homeowner, home features and/or value, or any other metric that may be useful in determining a likelihood of a roof repair request being obtained for the home. Example financial-related attributes include, but are not limited to, homeowner credit rating, homeowner wealth rating, homeowner income, homeowner investments, and homeowner net worth. Example homeowner demographics attributes include, but are not limited to, homeowner date of birth, homeowner gender, homeowner marital status, homeowner language, is homeowner? Y/N, family status, education code, and veteran status. As mentioned previously, a lead may be associated with a person, who may or may not be the homeowner or have decision making power regarding the repair. Accordingly, the homeowner demographics may account for such cases. For example, where the contact person for the roof repair job is not the homeowner, the attribute value score may be lower because of the lower likelihood that the contact person is able to make the decision to proceed with the repair job. Example home features attributes include, but are not limited to, home value, parking type (e.g., whether there's a garage or a carport), land use (e.g., farm), dwelling type (e.g., single family, multifamily), condition, exterior walls, number of units, stories, home value, square footage, roof cover, and roof type. For example, the attribute value score may be highest for a wood shake roof because of the high likelihood that such roofs will need repair due to the known poor longevity of such roofs.

Next, at step 504, the attribute value score for each of the plurality of attributes may be determined. Each attribute may have an algorithm for determining the attribute value score as discussed above. In some embodiments, the attribute value score is determined by assigning a score to an attribute type associated with the attribute. For example, for the homeowner income attribute, an attribute value score of 10 may be assigned to homeowners making greater than $150 k per year, an attribute value score of 7 may be assigned to homeowners making between 100-150 k per year, a score of 5 for homeowners making between 75-100 k, and a score of 3 to those making less than 75 k. As another example, for the dwelling type attribute, a score of 10 may be assigned to single family dwellings and to commercial buildings, while a score of 5 may be assigned to multifamily units. The other attributes described above may have attribute value scores determined in a similar manner as will be appreciated by one of skill in the art.

Next, at step 506, the attribute lead score for each attribute may be determined. The attribute lead score may be determined by multiplying the attribute weight assigned at step 502 by the attribute value score determined at step 504. Thereafter, at step 508, the overall lead score may be calculated by summing the plurality of attribute lead scores. Accordingly, a weighted lead score may be generated by analyzing a plurality of factors associated with the home and homeowner to acquiesce a likelihood that pursuing the lead will provide a positive return on investment. Attributes for which there is no or insufficient data to determine an attribute value score may be dropped from the summation.

At optional step 410, a recommendation or other action may be outputted and/or taken. In some embodiments, the recommendation is a go/no go for pursuing the lead. In some embodiments, the action is the assignation of the project manager to the lead. In some embodiments, the action comprises automatically contact the contact person for the lead about the roof repair job. In some embodiments, the action comprises ordering materials for the repair job.

User Interfaces

Exemplary user interfaces of the present disclosure are discussed hereinafter. The user interfaces may be displayed as part of client portal 252 and/or to a project manager user, salesperson, or insurance adjuster working with the homeowner user 254 on the repair project.

Figure 6:
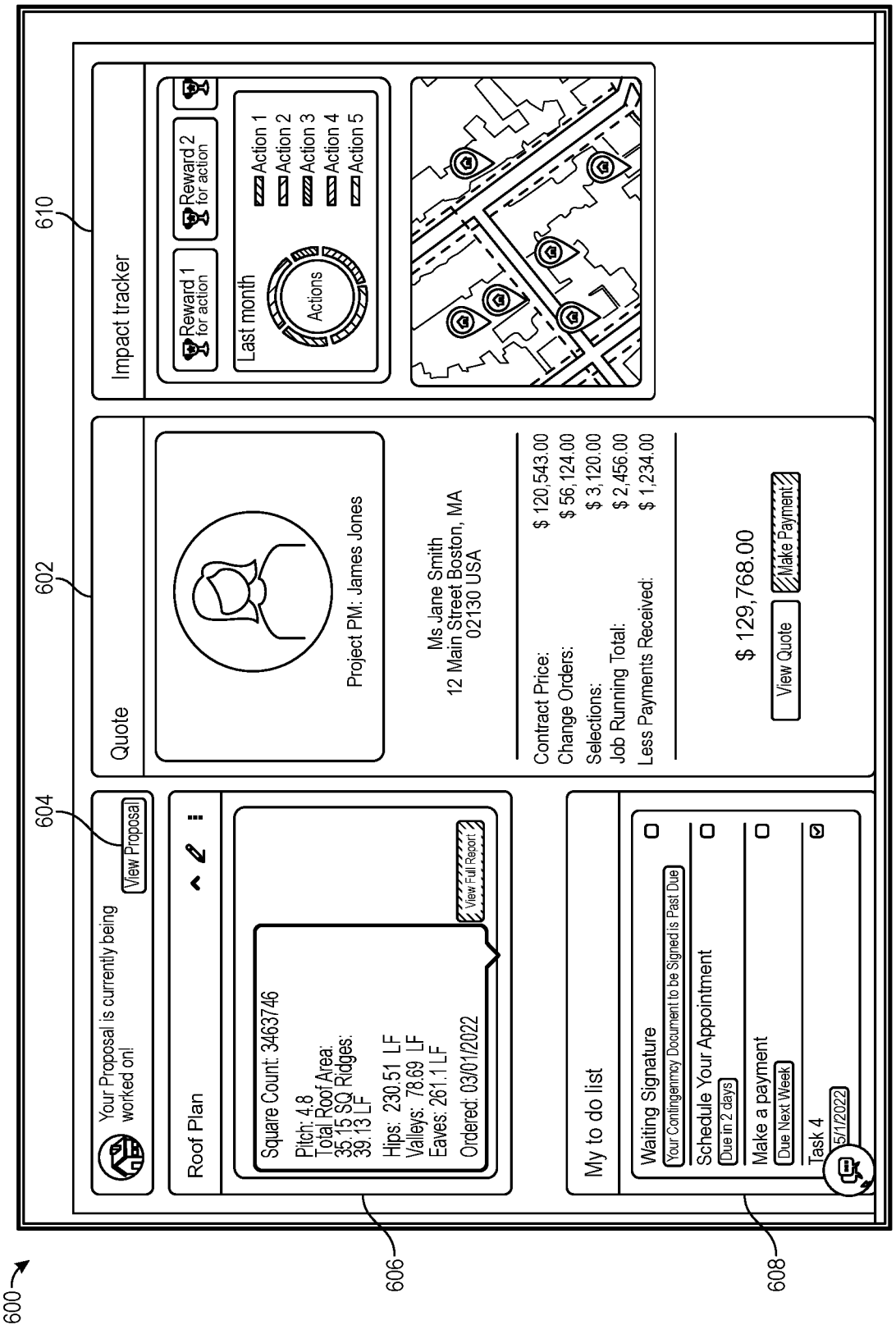
FIG. 6 depicts a homeowner portal user interface for embodiments of the present disclosure.

FIG. 6 illustrates a user interface depicting a homeowner portal page 600 for some embodiments of the present disclosure. Homeowner portal page 600 may comprise a plurality of panes for display information to the homeowner (e.g., user 254). As shown, a quotes pane 602 displays information relating to a quote for a repair project. Exemplary information that may be displayed in quotes pane 602 includes, but is not limited to, the project manager assigned to the project; the name of user 254; the address for the repair project; and financial information relating to the repair project. Quotes pane 602 may also comprise user interface affordances that are actuatable to launch a payment integration 266 and/or to view the quote in full.

Homeowner portal page 600 may also comprise a view proposal affordance 604 for viewing the proposal for the repair job. A roof plan pane 606 may display details associated with the repair plan. For example, the roof plan pane 606 may display square count, pitch, roof area, ridges, hips, valleys, eaves, and any other information relating to the roof or structure being repaired. In some embodiments, roof plan pane 606 displays a summary of information and further comprises a selectable affordance to view a full repair job report for the roof.

Homeowner portal page 600 may also comprise a to-do list pane 608. The to-do list pane 608 may display a list of tasks that require action by user 254, such as signing documents, scheduling an appointment with the project manager, making a payment, and the like. Additionally, homeowner portal page 600 may comprise a loyalty pane 610. The loyalty pane 610 may display information for any loyalty-as-a-service integration 260 as previously discussed.

Figure 7:
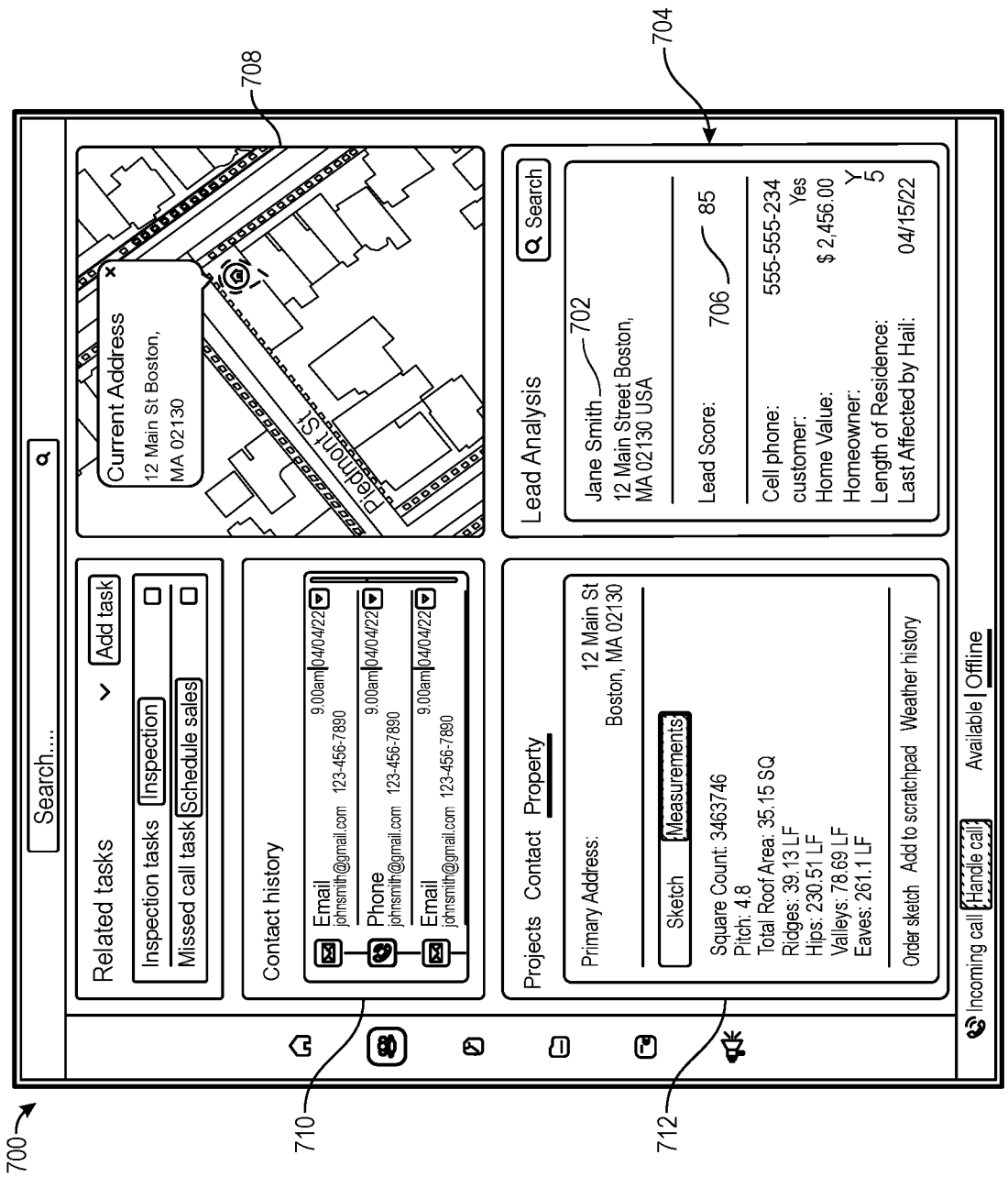
FIG. 7 depicts a leads user interface for embodiments of the present disclosure.

FIG. 7 illustrates a leads page 700 for some embodiments of the present disclosure. Leads page 700 may display various information relating to a lead 702 for one or more potential customers. Leads page 700 may be displayed to a project manager, salesperson, or the like who is attempting to obtain a bid or job for a repair project.

Leads page 700 illustrates an interface wherein the potential customer 704 is a known customer. When the potential customer 704 is a new customer, leads page 700 may be configured to receive user input for data relating to the new customer, such as name, address, home type, contact information, any of the attributes discussed above with respect to FIG. 5, or the like.

As shown, leads page 700 comprises a lead analysis pane 706 that displays information relating to the project lead 702. For example, lead analysis pane 706 may comprise details of potential customer 704, a lead score 708, and home information. The lead score 708 may be determined as discussed above with respect to FIG. 5. In some embodiments, if one or more attributes for lead score 708 have missing data, leads page 700 may display a prompt for obtaining that information and/or the homeowner associated with lead score 708 may be automatically alerted (e.g., via SMS, system architecture 250, or the like) to provide data for the missing attribute In some embodiments, lead analysis pane 706 is populated with the date that potential customer 704 was last affected by hail, or another weather event (e.g., tornado, hurricane, etc.)

Leads page 700 may further comprise a map pane 710 that may display the location of the building associated with potential customer 704 on a map interface. The map pane 710 may be selectable to launch a map integration that displays a route from the current location of the user to the building. Leads page 700 may further comprise a tasks pane map pane 710 that displays tasks relating to the lead 702 that the user needs to complete. For example, tasks such as return a call or complete an inspection may be displayed. Other tasks that may be displayed will be readily apparent to one of skill in the art upon reading this disclosure.

A history pane 712 may display a log of historical items associated with the lead. For example, previous correspondence between the potential customer 704 and the user may be displayed. Further, documents received, such as imagery of the damaged roof may be displayed. Additionally, a details pane 714 may be displayed. The details pane 714 may display various information relating to the lead, the potential repair project, the potential customer 704, or any combination thereof. For example, as shown, measurement details relating to the home are shown in details pane 714. In some embodiments, a sketch or other imagery for the house may be displayed. Details pane 714 may also comprise a contacts tab that may display contact information for potential customer 704 and/or a projects tab that may display project details for the potential customer 704.

Figure 8:
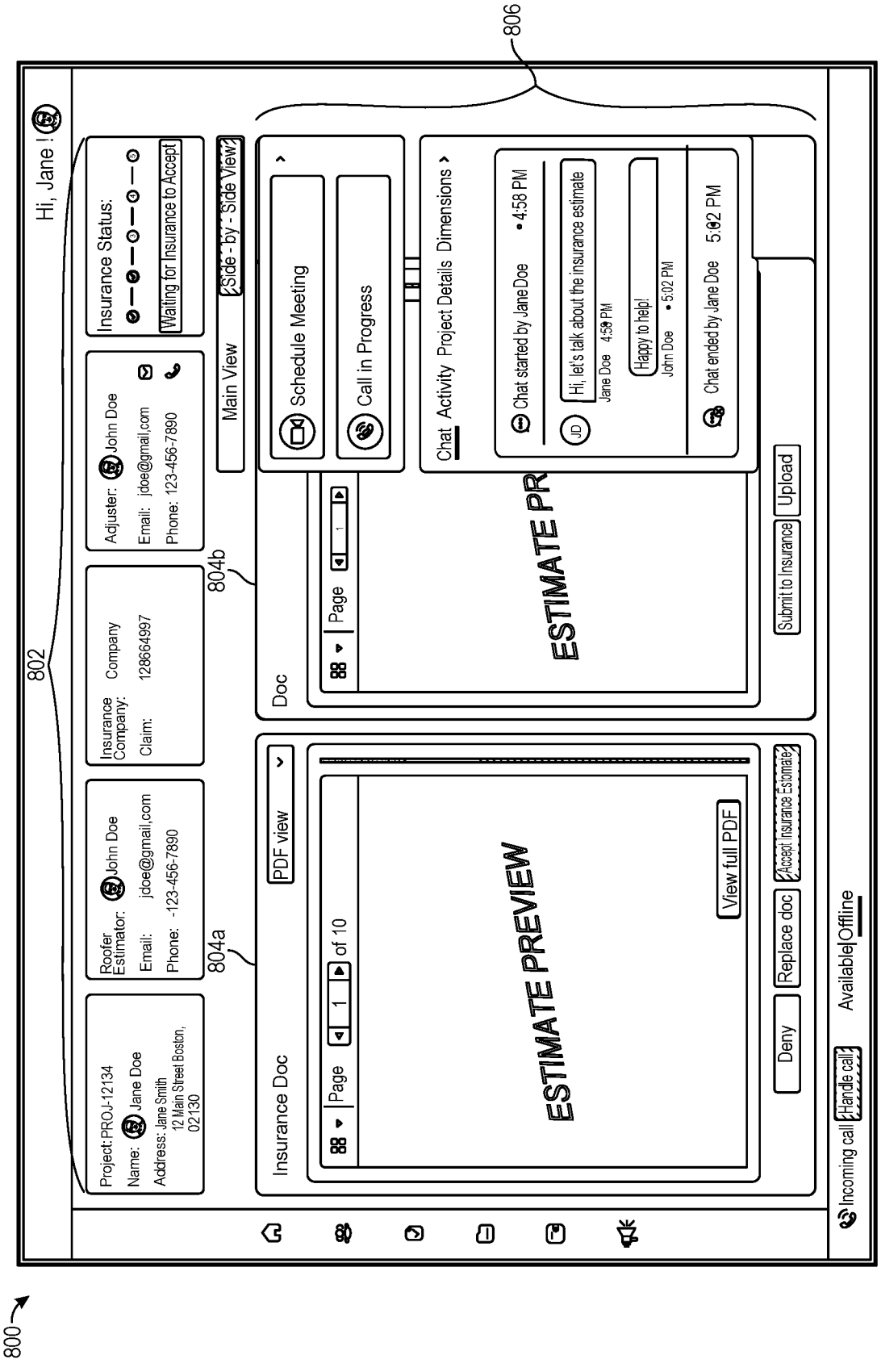
FIG. 8 depicts a side-by-side user interface for some embodiments of the present disclosure.

Turning now to FIG. 8, an insurance collaboration page 800 is depicted for some embodiments of the present disclosure. Insurance collaboration page 800 may provide an interface for a user 254 to collaborate with an insurance agent for a repair project. Insurance collaboration page 800 may comprise a status bar 802 displaying one or more panes, each of which may comprise information relating to the insurance claim and the repair project. For example, a project pane may display a project title, a homeowner, and a home address. An estimator pane may display contact information for the employee who created, finalized, or approved the repair project estimation. An insurance company pane may display information associated with the insurance company. An adjuster pane may display contact information for the insurance adjuster at the insurance company. A timeline pane may display a timeline of events for the repair project.

Insurance collaboration page 800 may have a main display area comprising a first pane 804a and a second pane 804b arranged in a side by side view. While depicted in a horizontal arrangement, first pane 804a and second pane 804b may be arranged vertically without departing from the scope hereof. First pane 804a may display a first insurance document provided by the insurance company. Second pane 804b may display the same insurance document as created by the user 254. The side-by-side view allows for the user and the insurance agent to collaborate on the documents simultaneously. In some embodiments, the panes 804a, 804b are configured as PDF viewers that allow for editing of the documents. The panes 804a, 804b may comprise comment integrations allowing each person working on the document to leave comments. In some embodiments, the panes 804a, 804b are configured with a ruler integration. For example, the user may upload an image of hail that damaged their roof, and the ruler integration can measure the hail via the image and provide the hail size to the insurance agent. In some embodiments, via insurance collaboration page 800, a PDF can be OCR'd, and a template of the estimate can be determined from the optical character recognition, which may then be auto populated based on the template and stored and/or retrieved information relating to the home and/or the homeowner.

In some embodiments, the insurance agent is provided a unique link to access insurance collaboration page 800 for collaboration with the user 254. Insurance collaboration page 800 may comprise all relevant information for the insurance agent to work with the user 254 on the estimate for the roof repair. Thus, insurance collaboration simultaneous collaboration on an insurance estimate. In contrast, collaboration between a homeowner and an insurance agent is typically carried out over back-and-forth emails.

Insurance collaboration page 800 may also comprise integrations for providing ease of communications between user 254 and the adjuster or any other person working on the repair project. For example, a video calling integration may be provided allowing the user 254 to initiate a video conference with the insurance adjuster. Additionally, a chat integration may be provided for SMS and MMS between the user 254 and the adjuster. An integrations pane 806 may include the chat history, along with an activity tab, a project details tab, a dimensions tab, or any combination thereof. The activity tab may display changes made to the above-described documents. The project details tab may display details relating to the project as discussed herein. The dimensions tab may display dimensions relating to the house or building being repaired. Generally, any information relating to the repair project may be displayed in integrations pane 806 without departing from the scope hereof.

In some embodiments, insurance collaboration page 800 is further operable to display the buy ratio of the insurer. As discussed previously, the buy ratio of an insurer may influence the processing of system 200. As with the lead score, buy ratios may be bucketed based on one or more thresholds, and buy ratios in different thresholds may be processed differently. In some embodiments, a low buy ratio may cause the system 200 to adjust its processing. For example, a low buy ratio may cause the system 200 to not preemptively order materials for a repair job. Instead, the system 200 may wait until a positive confirmation of the repair job is received from the customer.

Figure 9:
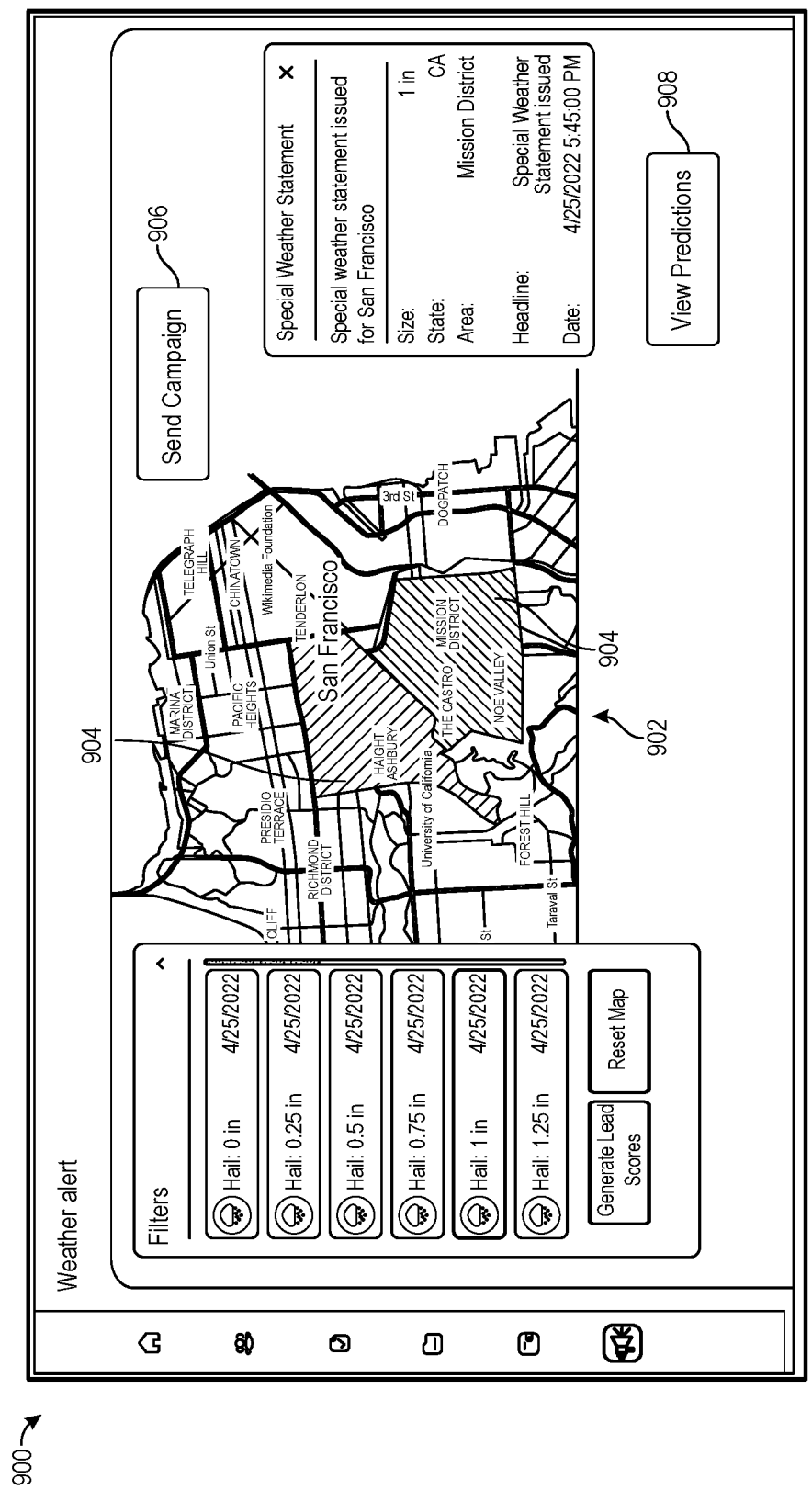
FIG. 9 depicts a weather map user interface for some embodiments of the present disclosure.

FIG. 9 illustrates a map interface 900 for some embodiments of the present disclosure. Map interface 900 may display regions 902 divided into one or more subregions 904 that have been affected by weather and/or are predicted to be affected by weather such that buildings within the subregions 904 may be in need of a repair project. Accordingly, a user, such a project manager, may use map interface 900 to visualize areas in a region 902 to target for potential repair projects.

One or more subregions 904 may be generated based on weather forecasting information 208 discussed above. In some embodiments, each subregion 904 is determined based on an intensity produced by a weather event. For example, if region 902 experiences a hailstorm, regions 902 may be divided into one or more subregions 904 based on a local intensity of the hailstorm (e.g., amount of hail). In some embodiments, alerts from a weather service are used to determine the intensity. In some embodiments, reports of storm damage are used to determine the intensity.

In some embodiments, lead scores are automatically calculated for a plurality of homes within a region 902, and the lead scores may be used to determine one or more subregions 904 (optionally, in conjunction with the weather information).

In some embodiments, map interface 900 comprises a send campaign affordance 906. Send campaign affordance 906 may be used to automatically generate a campaign. The campaign may be targeted at region 902, one or more one or more subregions 904, or specific homes within a one or more subregions 904. For example, the campaign may be targeted at homes with a lead score over a threshold located in a subregion 904 that had the highest weather event intensity (e.g., most hailfall, most damage reports, most insurance claims, etc.). In some embodiments, the campaign is a mass SMS event sent to all the homes meeting the criteria (and for which contact information is available). Other methods of informing potential customers about roof repairs are within the scope hereof.

In some embodiments, generation and/or adjustment of a campaign is performed automatically without requiring any input from a user. For example, if a subregion 904 experienced a weather event having an intensity/output above a threshold (or is predicted to experience such a weather event) and a number or percentage of homes within the subregion 904 have a buy ratio above a threshold, then a campaign may automatically be generated.

In some embodiments, map interface 900 further comprises a view predictions affordance 908 for predictions for a region 902. The predictions may relate to predicted job values, predicted lead scores, and other metrics. Various machine learning and/or artificial intelligence techniques may be used with embodiments of the present disclosure. In some embodiments, machine learning is used to predict the value of a repair job and/or a lead score for one or more homes. The value of the repair job may be the estimated profit from carrying out the repair job. In some embodiments, a random forest model is used. Other machine learning models (whether supervised or unsupervised) are within the scope hereof.

In some embodiments, the machine learning model is configured to provide a predicted job value based on (1) the month in which the job was approved and (2) a job type. The job type may be one or more of: roofing, gutters, siding, painting, or HVAC. The user may also define whether the job type is a repair, is an interior repair (e.g., within the building), a tarp up job, a bid, or any combination thereof. Furthermore, the user may further define whether the job is for windows, windows screens, quality control, the materials for the job, or any combination thereof.

In some embodiments, the data is preprocessed before being trained. In some embodiments, preprocessing the data comprises passing the data from first database 268 (which may store the approval month and job type data) to data warehouse 278. In some embodiments, the data is transformed by data pipeline 276 prior to and/or after passing the data to data warehouse 278. In some embodiments, the data is preprocessed and/or transformed to extract the above-described job types from the data passed to data warehouse 278 and/or to determine a count of each job type. Furthermore, the project address (e.g., address, city, state, zip code, latitude, longitude, etc.) may be extracted for each project. Other data, such as a job name, may be extracted from the transformation performed by data pipeline 276.

After preprocessing, the data may be transformed again for training the random forest model. In some embodiments, the data is transformed by removing extraneous data such that only the job type data and the approved month remains for inputting into the random forest model. For example, before transformation, a job may have an approved data that comprises a year, a month, and a date, and transforming the data may comprise removing the year and the date from the data such that only the month remains in the data.

In some embodiments, the data is transformed for a specific region. For example, only data from Kansas City, Missouri may be transformed for training. Transforming the data for a specific city may comprise extracting each data point that is associated with the specific city. Outliers may then be removed. For example, projects with a project value over a threshold and/or under a threshold may be removed from the data set. In some embodiments, outliers are not removed. In some embodiments, one hot encoding is applied to the approved month, which may be given an integer representation (e.g., 1=January and 12=December). By applying the one hot encoding, a binary vector may be created, allowing the difference in job value based on the approval month to be determined.

Thus, in some embodiments, the training set for the random forest model is data associated with repair jobs in a specific region. In some embodiments, the random forest model is built with 100 estimators, although generally any number of estimators may be used. Accordingly, an end user may be able to view a prediction of the value of a job as precited by the random forest model which is trained based on historical data including the job type and the month in which the job was approved. As discussed, machine learning models may be used for various other predictions. For example, the lead score may also be predicted using a machine learning model trained based on past lead scores.

While embodiments of the present disclosure have been discussed with respect to roofing repairs, it will be appreciated that the teachings may be applicable to various other industries. Generally, any weather-related industry in which work demand varies based on weather events may benefit from the teachings of the present disclosure. For example, it is contemplated that embodiments hereof may be used for predicting when homes will need siding repairs and/or replacements. As another example, embodiments hereof may be used for predicting when solar panels will need to be replaced, to determine the materials to purchase, when the best time to purchase the materials is, allocating workers for the job, etc. Other use cases may include HVAC repairs, lawn care, street icing, airline scheduling, insurance, and the like.

Although the present disclosure has been described with reference to the embodiments illustrated in the attached drawing figures, it is noted that equivalents may be employed, and substitutions made herein without departing from the scope of the present disclosure.

The invention claimed is:

1. A method for predicting repair projects, comprising:
training a first machine learning model to determine likelihoods of roofs requiring repairs for predicting an associated materials need for future roof repairs in a geographic region using a first training data set that comprises historical repair data and historical weather forecasting data; receiving, by the first machine learning model, current weather forecasting data indicative of a future weather event in the geographic region and aerial imagery of a plurality of homes in the geographic region; determining, by the first machine learning model and based on the current weather forecasting data and the aerial imagery, a likelihood of a roof requiring a repair for each of the plurality of homes in the geographic region to obtain a plurality of likelihoods: thresholding the plurality of likelihoods to identify a subset of the plurality of homes; and for each home of the subset of the plurality of homes having a lead likelihood above a threshold, preemptively determining needed materials for the repairs, wherein preemptively determining the needed materials comprises: obtaining, from a building dimensions database, dimensional data for each home; obtaining, from at least one materials database, materials data for each home, the materials data including at least a material type; and determining a needed materials type and a needed materials quantity based on analyzing the materials data and the dimensional data.

2. The method of claim 1, further comprising:
training a second machine learning model to determine lead likelihoods for the subset of the plurality of homes, the lead likelihoods indicating the likelihood of obtaining a roof repair; and
generating, by the second machine learning model and for a home in the subset of the plurality of homes, the lead likelihood indicative of the likelihood of obtaining the roof repair for the home.

3. The method of claim 2, wherein the lead likelihood is determined based in part on a plurality of weighted attributes associated with each home, and wherein the plurality of weighted attributes is determined by:
assigning a weight to each of a plurality of attributes;
determining, for each of the plurality of attributes, an attribute value score; and
determining the plurality of weighted attributes based on the weight and the attribute value score.

4. The method of claim 2, further comprising:
training a third machine learning model to determine values associated with the repair using a third training data set comprising the historical repair data; and
generating, by the third machine learning model, a value associated with the roof repair for each home of the subset of the plurality of homes.

5. The method of claim 4, wherein the historical repair data comprises a repair job month and a repair job type, and wherein the method further comprises:
receiving user input indicative of the repair job month and the repair job type; and
responsive to receiving the user input, outputting, by the third machine learning model, the value associated with the roof repair for the repair job month and the repair job type.

6. One or more non-transitory computer-readable media storing computer-executable instructions that, when executed by at least one processor, perform a method for predicting repair projects, comprising:

training a first machine learning model to determine likelihoods of roofs requiring repairs for predicting an associated materials need for future roof repairs in a geographic region using a first training data set that comprises historical repair data and historical weather forecasting data;

receiving, by the first machine learning model, current weather forecasting data for the geographic region;

determining, by the first machine learning model and based on the current weather forecasting data, a likelihood of a roof requiring a repair for each of a plurality of homes in the geographic region to obtain a plurality of likelihoods;

thresholding the plurality of likelihoods to identify a first subset of the plurality of homes;

training a random forest model using a second training data set comprising the historical repair data, wherein the historical repair data comprises a repair job month and a repair job type;

responsive to receiving user input of the repair job month and the repair job type for a home, generating, by the random forest model, a recommendation for pursuing the repair based on a projected value of the repair for the first subset of the plurality of homes;

determining a second subset of the plurality of homes based on the recommendation for each of the first subset of the plurality of homes; and for the second subset of the plurality of homes, automatically determining needed materials for the repair for each home of the second subset of the plurality of homes, wherein, for the second subset of the plurality of homes, determining the needed materials comprises:

retrieving dimensional data of the home; and determining a quantity of the needed materials to requisition based on the dimensional data.

7. The media of claim 6, wherein the recommendation is based in part on a plurality of weighted attributes associated with the home, wherein the plurality of weighted attributes comprises homeowner demographic attributes.

8. The media of claim 7, wherein the plurality of weighted attributes further comprises a roof cover weighted attribute and a building square footage weighted attribute.

9. The media of claim 6, wherein the method further comprises:

causing display of a user interface, the user interface configured for collaboration between a first user associated with the repair and a second user associated with the repair, wherein the user interface enables simultaneous collaboration of one or more electronic documents associated with the repair.

10. The media of claim 9, wherein the user interface further comprises a ruler integration configured to measure a size of a piece of hail from an image uploaded from the first user and communicate the size to the second user.

11. The media of claim 6, wherein the current weather forecasting data comprises severe weather alerts transmitted by a weather service.

12. A system for predicting repair projects comprising one or more non-transitory computer-readable media storing computer-executable instructions that, when executed by at least one processor, execute instructions, comprising:

training a first machine learning model to determine likelihoods of roofs requiring repairs for predicting an associated materials need for future roof repairs in a geographic region using a first training data set that comprises historical repair data and historical weather forecasting data;

receiving, by the first machine learning model, weather forecasting data indicative of a future weather event for the geographic region;

separating the geographic region into a plurality of subregions based on the weather forecasting data;

determining, by the first machine learning model and based on the weather forecasting data, a likelihood of a roof requiring a repair for each of a plurality of homes in at least one subregion to obtain a plurality of likelihoods;

thresholding the plurality of likelihoods to identify a subset of the plurality of homes;

training a second machine learning model to determine a lead likelihood for each of the subset of the plurality of homes, the lead likelihood indicating the likelihood of obtaining a roof repair;

outputting, by the second machine learning model, the lead likelihood for each of the plurality of homes in the at least one subregion of the plurality of subregions;

for each home in the at least one subregion, determining whether the lead likelihood is above a threshold lead likelihood to obtain a subset of homes;

for each home in the subset of homes, automatically determining needed materials for the roof repair for each home, by:

obtaining, from a building dimensions database, dimensional data for each home;

obtaining, from at least one materials database, materials data for each home, the materials data including at least a material type; and determining the needed materials based on the dimensional data and the materials data; and causing display of the needed materials via a graphical user interface.

13. The system of claim 12, wherein each of the plurality of subregions is determined based on an intensity of a recent weather event affecting the geographic region.

14. The system of claim 12, wherein the instructions further comprise:

causing display of a map interface for the geographic region, wherein the map interface displays:

the geographic region divided into the plurality of subregions based on weather intensity and the lead likelihood determined for the plurality of homes in the geographic region.

15. The system of claim 12, further comprising:

responsive to receiving an acceptance of the roof repair from a user:

receiving, via the graphical user interface and from the user, an electronic document;

performing optical character recognition on the electronic document to determine a template of the electronic document; and based on the template, auto-populating the electronic document using homeowner data associated with the user.

16. The system of claim 12, further comprising:

causing display of a collaboration page in the graphical user interface allowing simultaneous collaboration on an insurance estimate by a user and an additional user; and causing transmission of a unique link to the additional user to access the collaboration page.

17. The system of claim 12, wherein the threshold lead likelihood is a first threshold lead likelihood and further comprising:
   based on the lead likelihood being higher than a second threshold lead likelihood that is greater than the first threshold lead likelihood, automatically acquiring the needed materials.

18. The system of claim 12, wherein training the second machine learning model further comprises training the second machine learning model to determine the likelihood of the roof repair being accepted based on the lead likelihood.

19. The system of claim 12, wherein the instructions further comprise:
   training a third machine learning model to determine values associated with the repair using a third training data set comprising the historical repair data; and
   generating, by the third machine learning model, a value associated with the roof repair for each home of the subset of the plurality of homes.

20. The system of claim 19, wherein the historical repair data comprises a repair job month and a repair job type, and wherein the instructions further comprise:
   receiving user input indicative of the repair job month and the repair job type; and
   responsive to receiving the user input, outputting, by the third machine learning model, the value associated with the roof repair for the repair job month and the repair job type.

* * * * *